US011937023B2

(12) United States Patent
Pertierra et al.

(10) Patent No.: US 11,937,023 B2
(45) Date of Patent: *Mar. 19, 2024

(54) SYSTEM AND METHOD FOR DISPLAYING HIGH QUALITY IMAGES IN A DUAL MODULATION PROJECTION SYSTEM

(71) Applicants: DOLBY LABORATORIES LICENSING CORPORATION, San Francisco, CA (US); DOLBY INTERNATIONAL AB, Dublin (IE)

(72) Inventors: Juan P. Pertierra, Fishers, IN (US); Martin J. Richards, Gig Harbor, WA (US); Christopher John Orlick, Furlong, PA (US); Clement Le Barbenchon, Los Angeles, CA (US); Angelo M. Pires Arrifano, Villeneuve-Loubet (FR)

(73) Assignees: DOLBY LABORATORIES LICENSING CORPORATION, San Francisco, CA (US); DOLBY INTERNATIONAL AB, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/166,306

(22) Filed: Feb. 8, 2023

(65) Prior Publication Data

US 2023/0188685 A1 Jun. 15, 2023

Related U.S. Application Data

(63) Continuation of application No. 17/572,060, filed on Jan. 10, 2022, now Pat. No. 11,611,727, which is a (Continued)

(30) Foreign Application Priority Data

Sep. 25, 2017 (EP) .................... 17192946

(51) Int. Cl.
*H04N 9/31* (2006.01)

(52) U.S. Cl.
CPC ........... *H04N 9/312* (2013.01); *H04N 9/3108* (2013.01); *H04N 9/3152* (2013.01); *H04N 9/3188* (2013.01); *H04N 9/3194* (2013.01)

(58) Field of Classification Search
CPC ........ H04N 9/312; H04N 9/31; H04N 9/3152; H04N 9/3108; H04N 9/3188;
(Continued)

(56) References Cited

U.S. PATENT DOCUMENTS 6,437,919 B1 8/2002 Brown
6,940,653 B2 9/2005 Favalora
(Continued)

FOREIGN PATENT DOCUMENTS

CA 2950958 A1 12/2015
GB 2485609 A 2/2018
(Continued)

OTHER PUBLICATIONS

US 9,906,760 B2, 02/2018, Damberg (withdrawn)
(Continued)

*Primary Examiner* — Sherrie Hsia

(57) ABSTRACT

A novel high efficiency image projection system includes a beam-steering modulator, an amplitude modulator, and a controller. In a particular embodiment the controller generates beam-steering drive values from image data and uses the beam-steering drive values to drive the beam-steering modulator. Additionally, the controller utilizes the beam-steering drive values to generate a lightfield simulation of a lightfield projected onto the amplitude modulator by the beam-steering modulator. The controller utilizes the lightfield simulation to generate amplitude drive values for
(Continued)

driving the amplitude modulator in order to project a high quality version of the image described by the image data.

20 Claims, 33 Drawing Sheets

Related U.S. Application Data continuation of application No. 17/131,812, filed on Dec. 23, 2020, now Pat. No. 11,228,740, which is a continuation of application No. 16/650,545, filed as application No. PCT/US2018/052347 on Sep. 24, 2018, now Pat. No. 10,904,495.

(60) Provisional application No. 62/562,937, filed on Sep. 25, 2017.

(58) Field of Classification Search
CPC .... H04N 9/3194; G02B 27/0012; G02B 3/02; G02F 1/13306
USPC ........ 348/744, 739, 758, 759; 359/237, 238, 359/276, 11
See application file for complete search history.

(56) References Cited

U.S. PATENT DOCUMENTS

| | | |
|---|---|---|
| 7,492,948 B2 | 2/2009 | Gluckstad |
| 7,551,341 B1 | 6/2009 | Ward |
| 9,049,413 B2 | 6/2015 | Richards |
| 9,232,172 B2 | 1/2016 | Perkins |
| 9,513,600 B2 | 12/2016 | Sugiyama |
| 9,848,176 B2 | 12/2017 | Damberg |
| 9,874,319 B2 | 1/2018 | Minor |
| 10,003,776 B2 | 6/2018 | Damberg |
| 2006/0103811 A1 | 5/2006 | May |
| 2006/0279662 A1 | 12/2006 | Kapellner |
| 2008/0273234 A1 | 11/2008 | Mehrl |
| 2014/0043352 A1 | 2/2014 | Damberg |
| 2015/0036057 A1 | 2/2015 | Richards |
| 2016/0241828 A1 | 8/2016 | Richards |
| 2016/0295178 A1 | 10/2016 | Damberg |
| 2016/0381329 A1 | 12/2016 | Damberg |
| 2017/0034486 A1 | 2/2017 | Richards |
| 2017/0085846 A1 | 3/2017 | Damberg |
| 2017/0127025 A1 | 5/2017 | Damberg |
| 2018/0048873 A1 | 2/2018 | Damberg |
| 2018/0176519 A1 | 6/2018 | Damberg |

FOREIGN PATENT DOCUMENTS

| | | |
|---|---|---|
| WO | 2015/184549 | 12/2015 |
| WO | 2015200138 | 12/2015 |
| WO | 2016015163 | 2/2016 |
| WO | 2016108157 A1 | 7/2016 |

OTHER PUBLICATIONS

Damberg, G. et al "High Brightness HDR Projection Using Dynamic Phase Modulation" ACM Digital SIGGRAPH Aug. 2015, Los Angeles, CA.

De Nicola, S. et al."Reconstruction of Digital holograms on Tilted Planes" Proc. SPIE 6311, Optical Information Systems IV, Aug. 30, 2006.

Gerwin, D. et al "High Brightness HDR Projection Using Dynamic Freeform Lensing" ACM Transactions on Graphics, vol. 35, No. 3, article 24 published in Apr. 2016.

Glen D. Gillen et al: "Modeling and propagation of near-field diffraction patterns: A more complete approach", American Journal of Physics, vol. 72, No. 9, Sep. 1, 2004,, pp. 1195-1201.

Han, Wei, "Engineering of Complex Optical Fields and its Applications" Dissertation submitted to the School of Engineering of the University of Dayton, Aug. 2013.

Hoskinson, R. et al "Light Reallocation for High Contrast Projection using an Analog Micromirror Array" ACM SIGGRAPH Conference Proceedings, pp. 1-10, 2010.

Kurzweg, Timothy P. "Optical Propagation Methods for System-Level Modeling of Optical Mem Systems" submitted to the graduate Faculty of the School of Engineering 2002.

Roger Easton: "Optics of Imaging Systems Course Notes for 1051-733", Jun. 6, 2012 (Jun. 6, 2012), XP055531556, Retrieved from the Internet: URL:https://www.cis.rit.edu/class/simg733.

Anonymous: "Huygens-Fresnel principle—Wikipedia",Aug. 31, 2017 (Aug. 31, 2017), XP093005801,6 pages.

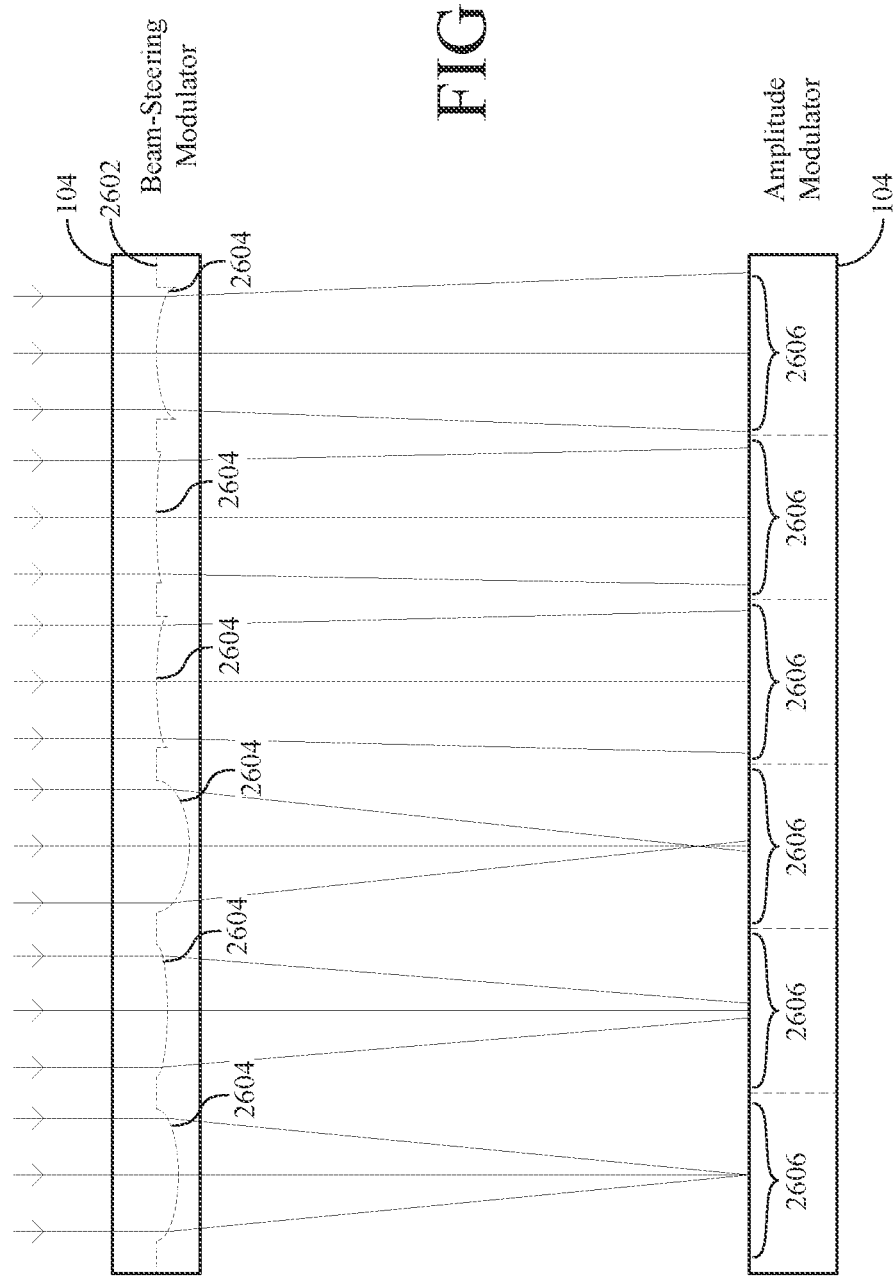

SYSTEM AND METHOD FOR DISPLAYING HIGH QUALITY IMAGES IN A DUAL MODULATION PROJECTION SYSTEM

CROSS-REFERENCE TO RELATED APPLICATIONS

This application is the continuation of U.S. patent application Ser. No. 17/572,060 filed Jan. 10, 2022, which is the continuation of U.S. patent application Ser. No. 17/131,812 filed Dec. 23, 2020, now U.S. Pat. No. 11,228,740, which is the continuation of U.S. patent application Ser. No. 16/650,545 filed Mar. 25, 2020, now U.S. Pat. No. 10,904,495, which is the US national phase of PCT/US2018/052347 filed Sep. 24, 2018, which claims the benefit of priority from U.S. Patent Application No. 62/562,937 filed Sep. 25, 2017 and European Patent Application No. 17192946.6 filed Sep. 25, 2017 which are hereby incorporated by reference in their entirety.

BACKGROUND OF THE INVENTION

Field of the Invention

This invention relates generally to dual modulation projection systems, and more particularly to systems and methods for generating high-contrast, high-brightness, and high-quality images.

Description of the Background Art

Some dual-modulation projection systems utilize a pre-modulator and a primary modulator, which are both spatial light modulators (SLMs), to project high-quality images (i.e. images having high-contrast, high dynamic range, etc.). The pre-modulator provides an intermediate image, which can be a rough approximation of a desired image as defined by corresponding image data, to the primary modulator. Typically, the pre-modulator is either a beam-steering device, which redirects light at various angles with respect to a surface of the pre-modulator, or an amplitude modulating device, which spatially alters an amplitude distribution of an incident lightfield. Some SLMs, such as digital micro-mirror devices (DMDs) are technically beam-steering modulators, but can be used to produce perceived amplitude modulation and are often referred to as amplitude modulators.

The primary modulator spatially modulates the intermediate image to form a final image, which is a finer representation of the desired image defined by the image data. Typically, the primary modulator is an amplitude modulator. Examples of amplitude modulators include, but are not limited to, liquid crystal on silicon (LCOS) devices, DMDs, and so on. In order to drive the primary modulator to create the final image with sufficient quality, the intermediate image must be known at a high level of detail. Thus, there are a number of problems associated with driving the pre-modulator and the primary modulator to generate acceptable quality in the final image.

A major problem associated with driving the pre-modulator is determining the required pre-modulator drive values to generate the intermediate image with sufficient quality while maintaining computational efficiency. Another problem is determining drive values that make efficient use of the lightfield incident on the pre-modulator. These problems are particularly difficult to solve in systems utilizing a beam-steering device as the pre-modulator.

A major problem associated with driving the primary modulator is simulating the intermediate image with sufficient detail to determine the required primary modulator drive values while maintaining computational efficiency.

SUMMARY

Embodiments of the present disclosure overcomes problems associated with the prior art by providing a dual modulation display systems and driving methods that produce high efficiency, high quality images using a beam-steering spatial light modulator as a premodulator to provide an incident lightfield on a primary modulator. The invention facilitates improved efficiency and control in the generation of the lightfield by the beam-steering premodulator and increased accuracy in modeling the generated lightfield.

Embodiment of the present disclosure relate to a method and a controller. Any of the methods disclosed herein may be implemented with a non-transitory, electronically-readable medium having code embodied therein that, when executed, will cause an electronic device to perform the disclosed method. Examples, of non-transitory electronically readable media include, but are not limited to, volatile memory, non-volatile memory, hardware, software, firmware, and/or any combination of the foregoing examples.

BRIEF DESCRIPTION OF THE DRAWINGS

The present invention is described with reference to the following drawings, wherein like reference numbers denote substantially similar elements:

FIG. 26 is a sectional view of a portion of the projection system of FIG. 1 during a calibration procedure.

DETAILED DESCRIPTION

The present invention overcomes the problems associated with the prior art, by providing multiple systems and methods for displaying high-contrast, high-brightness and high-quality images. In the following description, numerous specific details are set forth (e.g., particular modulator types, number of modulators, etc.) in order to provide a thorough understanding of the invention. Those skilled in the art will recognize, however, that the invention may be practiced apart from these specific details. In other instances, details of well-known image projection practices (e.g., data transfer, driving schemes, routine optimization, etc.) and components have been omitted, so as not to unnecessarily obscure the present invention.

Figure 1:
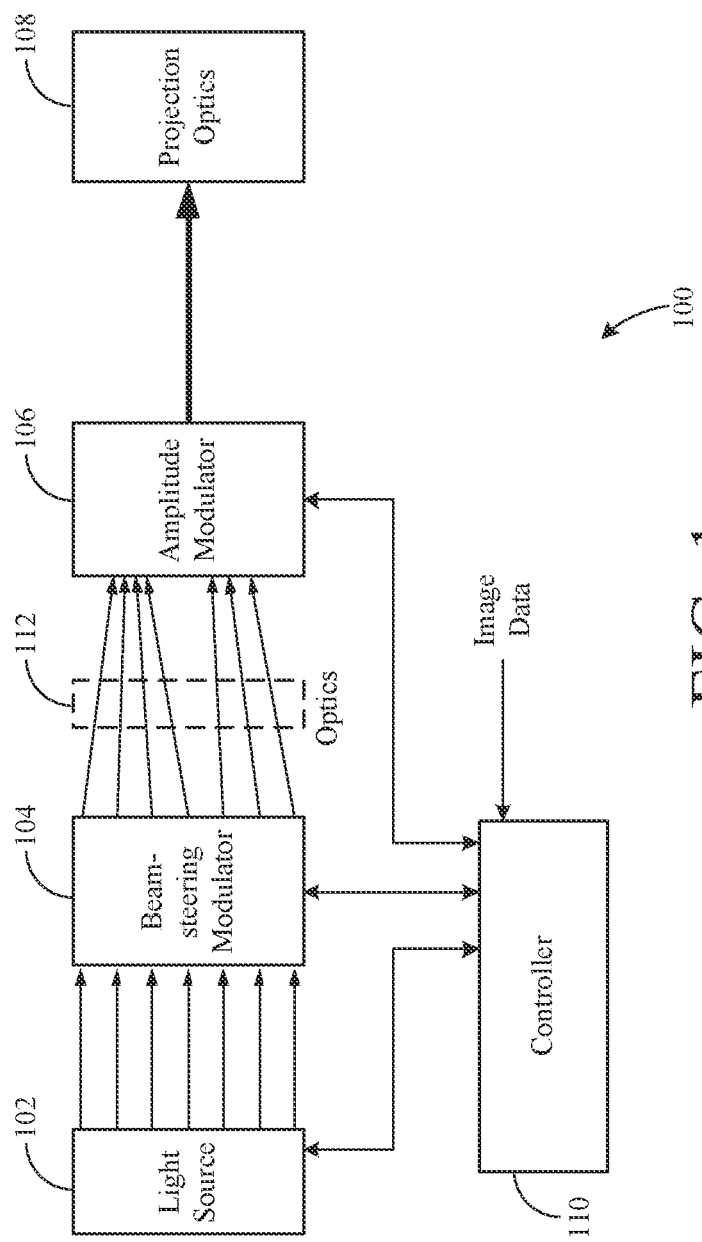
FIG. 1 is a block diagram of an example dual-modulation projection system.

FIG. 1 is a block diagram of a dual-modulation projection system 100, according to the present invention. Projection system 100 generates high quality images from image data and includes a light source 102, a beam-steering modulator 104, an amplitude modulator 106, projection optics 108, and a controller 110. Light source 102 shines a flat lightfield onto beam-steering modulator 104. Beam-steering modulator 104 selectively steers portions the light comprising the flat lightfield through a set of intermediate optics 112 and onto amplitude modulator 106, to form an intermediate image on the surface of amplitude modulator 106. Amplitude modulator 106 spatially modulates the intermediate image to form a final image, which is directed toward projection optics 108. Projection optics 108 is a set of lenses, prisms, and/or mirrors, which direct the final image toward a screen or other surface to be viewed by an audience.

Controller 110 controls and coordinates the other elements of projection system 100, based on image data received from a data source (not shown). Controller 110 provides control instructions to light source 102, beam-steering modulator 104, and amplitude modulator 106, based at least in part on the received image data. The control instructions include, at least, beam-steering drive values and amplitude drive values sent to beam-steering modulator 104 and amplitude modulator 106, respectively. These control instructions drive beam-steering modulator 104 and amplitude modulator 106 in order to generate the intermediate and final images. Controller 110 utilizes numerous methods and algorithms, which are discussed in detail below, to generate the drive values based on the received image data, and also to generate the amplitude drive values based on lightfield simulations.

In the example embodiment, light source 102 is an array of tunable lasers. In alternate embodiments, light source 102 can be replaced by an array of light-emitting diodes (LEDs), a dimmable bulb and appropriate optics, or any other suitable light source, including those now known or yet to be invented. Additionally, beam-steering modulator 104 and amplitude modulator 106 can be liquid crystal phase and amplitude spatial light modulators (SLMs), respectively. In alternate embodiments, beam-steering modulator 104 can be a tip-tilt mirror device, a microelectromechanical systems (MEMS) device, or any other light steering device, including those now known or yet to be invented. Amplitude modulator 106 can be a digital micro-mirror device (DMD) or any other suitable amplitude modulating device, including those now known or yet to be invented.

In the description of example embodiments beam-steering modulator 104 and amplitude modulator 106 are thus named to distinguish between an SLM that is used to steer light to create a lightfield on a primary modulator (beam-steering modulator 104) and an SLM that modulates selected portions of the lightfield to create an image for viewing (amplitude modulator 106). However, these terms are not used in a limiting sense. For example, DMDs selectively steer light along or out of an optical path, but are used as amplitude modulators by time multiplexing the amount of light steered into or out of an image to create an intermediate gray level (perceived amplitude modulation). As another example, liquid crystal SLMs selectively alter the phase of light and can, therefore, be considered a phase modulating or beam steering device. However, the birefringent property of liquid crystals also results in polarization rotation, and so liquid crystal SLMs can be used with internal or external polarizers to provide amplitude modulation. Therefore, devices referred to as "amplitude modulators", "phase modulators", or "beam-steering modulators" are understood to include any device capable of performing the titled function, either alone or in combination with other devices.

Figure 2:
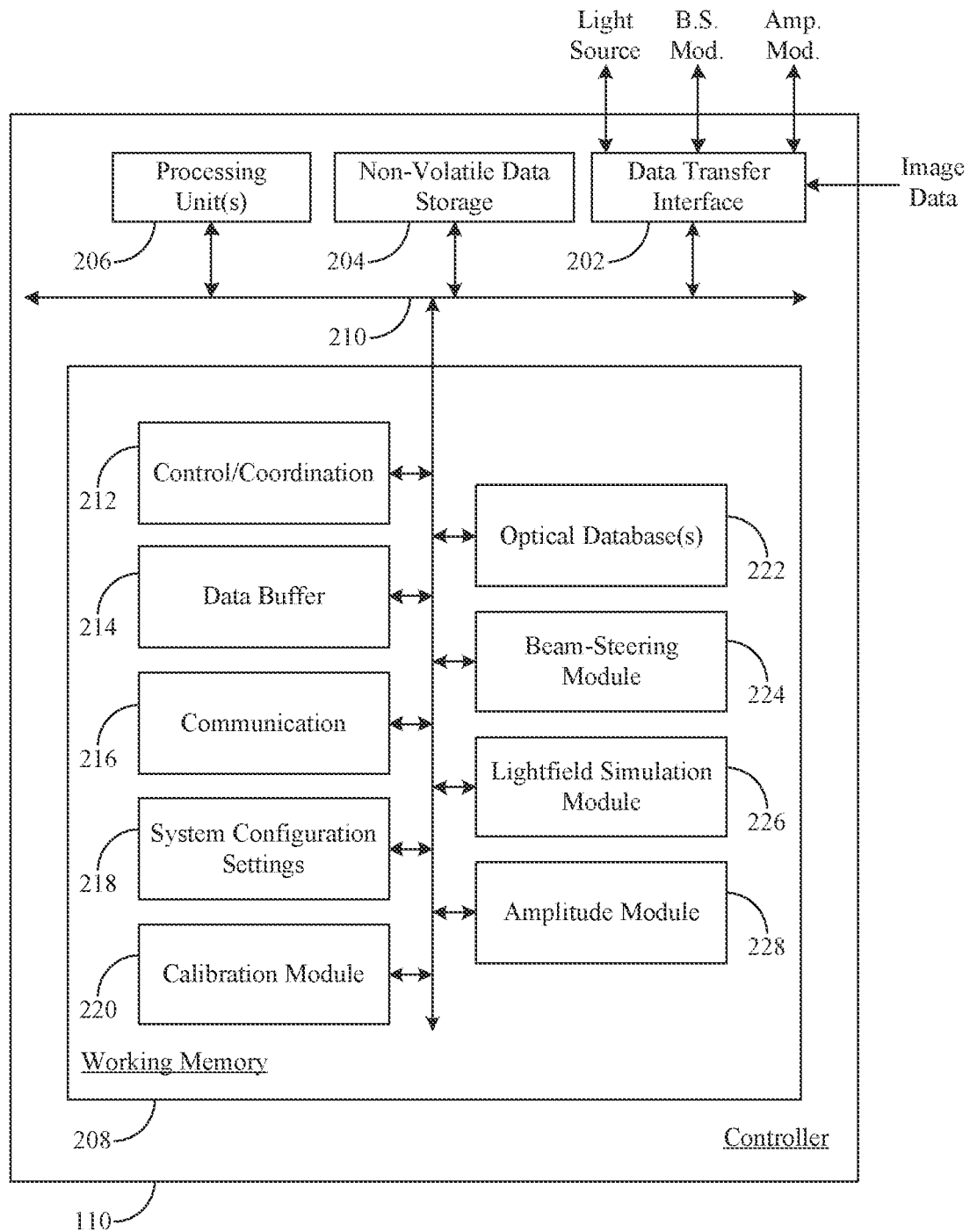
FIG. 2 is a block diagram of the controller of FIG. 1.

FIG. 2 shows controller 110, including a data transfer interface 202, non-volatile data storage 204, one or more processing unit(s) 206, and a working memory 208. The components of controller 110 communicate with one another via a system bus 210, which is interconnected between the components of controller 110. Data transfer interface 202 controls the transfer of data, including image data and control instructions, to and from controller 110. Non-volatile data storage 204 stores data and code and retains the data and code even when controller 110 is powered down. Processing unit(s) 206 impart functionality to controller 110 by executing code stored in non-volatile data storage 204 and/or working memory 208.

Working memory 208 provides temporary storage for data and code. Some functionality of controller 110 is represented by data and code modules shown within working memory 208. The data and code modules are transferred (in whole or in part) into and out of working memory 208 from non-volatile data storage 204, as determined by the execution of code by processing unit(s) 206. The data and code modules can be implemented, for example, with any combination of hardware, software, and/or firmware.

Working memory 208 includes a control/coordination module 212, a data buffer 214, a communication module 216, system configuration settings 218, a calibration module 220, an optical database(s) 222, a beam-steering module 224, a lightfield simulation module 226, and an amplitude module 228. Control/coordination module 212 is a higher level program that provides overall coordination and control of the other functional aspects of controller 110. Data buffer 214 temporarily stores data to be utilized by the other components of controller 110. Communication module 216 facilitates communication with external devices in order to send/receive code/control instructions. System configuration settings 218 include user defined settings that partially control the operation of other components of controller 110. Calibration module 220 includes data and algorithms used to calibrate projection system 100. Optical database(s) 222 is a database including definitions and/or characteristics of a variety of optical elements that can be referenced by the other components of controller 110. Beam-steering module 224 includes data and algorithms for generating beam-steering drive values from image data. Lightfield simulation module 226 includes data and algorithms for generating a simulation of the lightfield generated by beam-steering modulator 104 from the beam-steering drive values. Amplitude module 228 includes data and algorithms for generating amplitude drive values from image data and the lightfield simulation.

Figure 3:
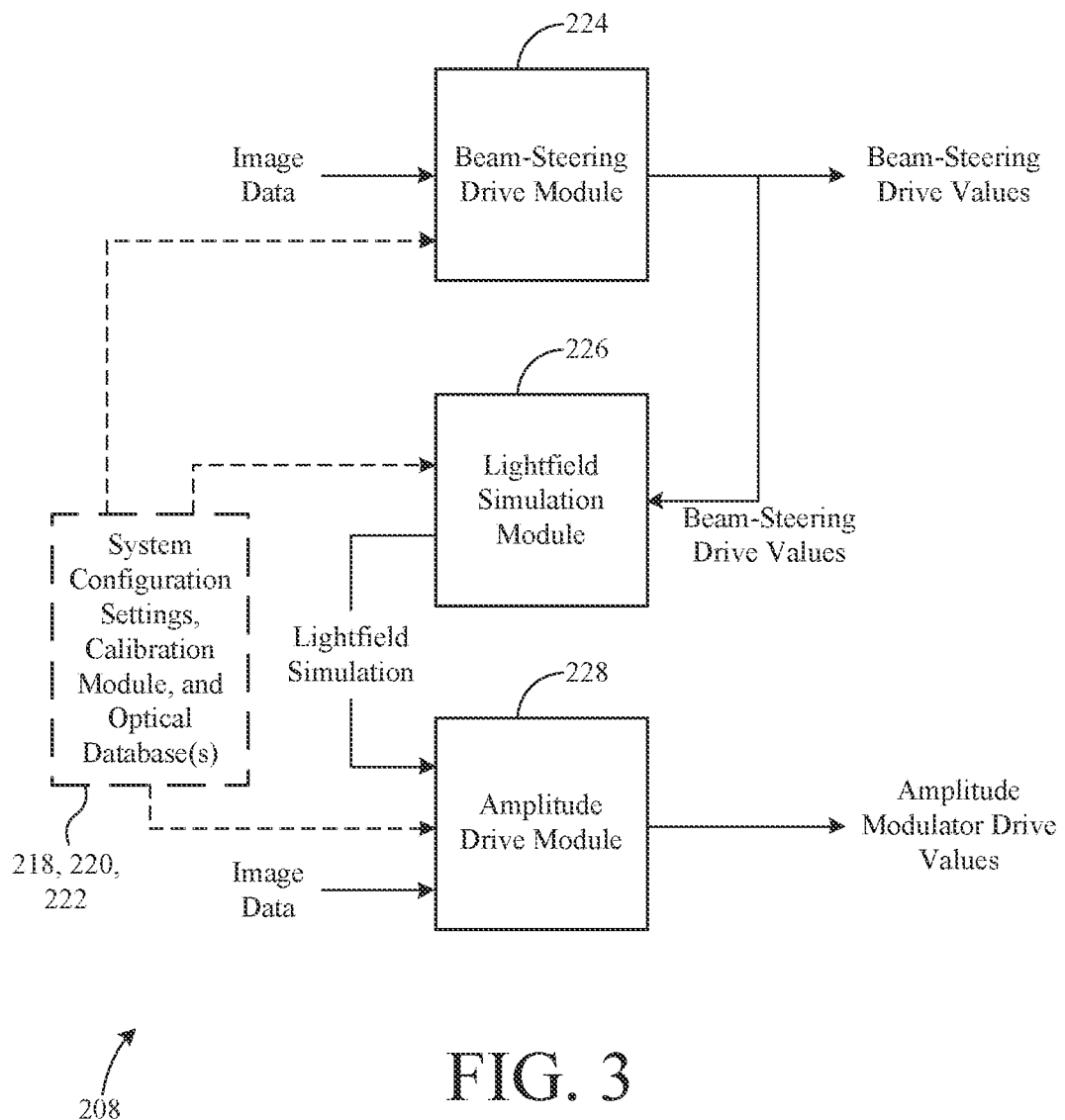
FIG. 3 is a block diagram illustrating an example data flow between the modules of the controller of FIG. 1 to drive the other components of the projection system of FIG. 1.

FIG. 3 is a block diagram illustrating an example data flow between the modules of the controller of FIG. 1 to drive the other components of the projection system of FIG. 1. The modules shown in FIG. 3 are stored and executed within working memory 208 (FIG. 2) of controller 110. First, beam-steering module 224 receives image data from data transfer interface 202. Using one (or more) of a variety of methods and/or algorithms, which will be described in greater detail below, beam-steering module 224 generates a set of drive values for driving beam-steering modulator 104 (FIG. 1) from the image data. The beam steering drive values are provided to drive beam-steering modulator 104, and also provided to lightfield simulation module 226, to be utilized for generating a simulation of the resulting lightfield on amplitude modulator 106. Using one (or more) of a variety of methods and/or algorithms, lightfield simulation module 226 generates a lightfield simulation, which will be utilized for generating a set of drive values for driving amplitude modulator 106. The lightfield simulation is provided directly to amplitude module 228. Amplitude modulator uses one (or more) methods and/or algorithms to generate a set of drive values for driving amplitude modulator 106 from the lightfield simulation and the image data, and provides the amplitude drive values to amplitude modulator 106.

In the example embodiment, beam-steering module 224, lightfield simulation module 226, and amplitude module 228 each utilize relevant data from system configuration settings 218, calibration module 220, and optical database(s) 222. For example, beam-steering module 224 and lightfield simulation module 226 utilize data from optical database(s) 222 describing the characteristics of optics 112, in order to predict how optics 112 will affect the lightfield generated by beam-steering modulator 104. Beam-steering module 224 and lightfield simulation module 226 can also utilize data from system configuration settings 218 or calibration module 220 to determine where optics 112 is placed, how optics 112 affected the lightfield during calibrations, etc. Beam-steering module 224, lightfield simulation module 226, and amplitude module 228 are together able to generate beam-steering and amplitude drive values that are required to produce high quality images via projection system 100, utilizing data from system configuration settings 218, calibration module 220, and optical database(s) 222.

Figure 4:
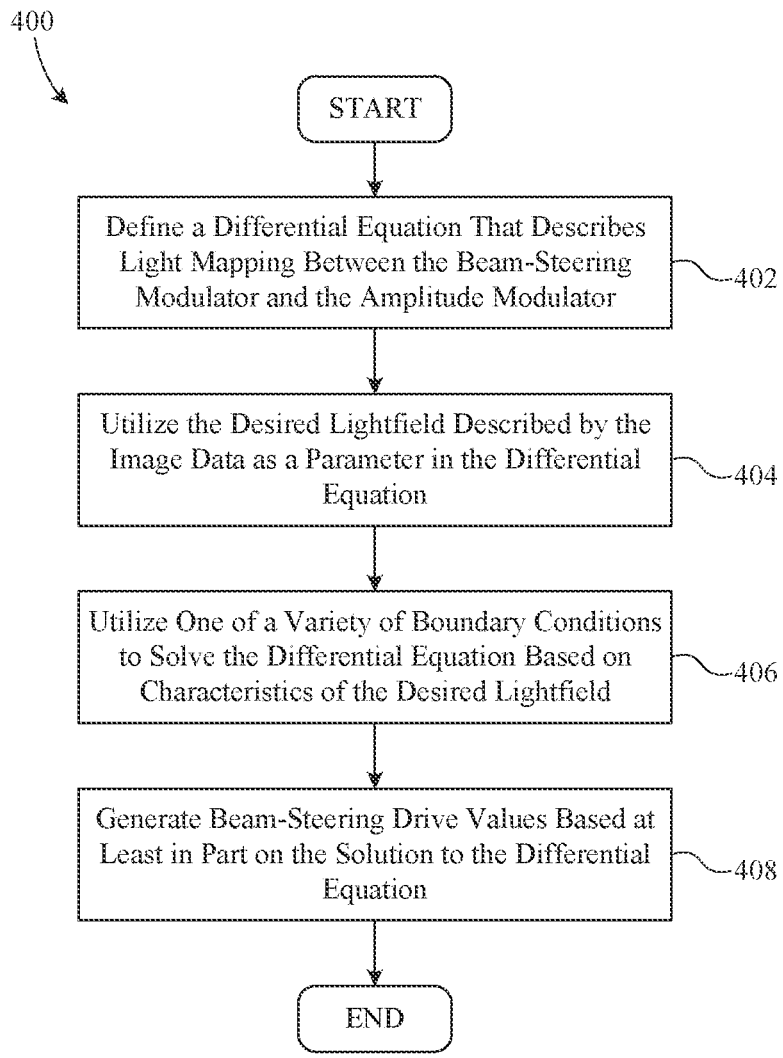
FIG. 4 is a flow chart summarizing an example method for generating beam-steering drive values from image data.

FIG. 4 is a flow chart summarizing an example method 400 for generating beam-steering drive values from image data. In the example embodiment, method 400 is performed by beam-steering drive module 224, utilizing data from other elements of controller 110. In alternate embodiments some steps of method 400 can be performed by other elements and/or system designers/users. In a first step 402, a differential equation that describes light mapping between beam-steering modulator 104 and amplitude modulator 106 is defined. The differential equation mathematically describes the propagation of light between beam-steering modulator 104 and amplitude modulator 106 in terms of points on the surfaces of beam-steering modulator 104 and amplitude modulator 106. Then, in a second step 404, the desired lightfield on amplitude modulator 106 (derived from the image data) is used as a parameter in the differential equation. Next, in a third step 406, one of a variety of boundary conditions is utilized to solve the differential equation. The solution to the differential equation describes the lightfield at the surface of beam-steering modulator 104 that is required to generate the desired lightfield on the surface of amplitude modulator 106. The appropriate boundary condition is chosen based on characteristics of the desired lightfield. Finally, in a fourth step 408, beam-steering drive values are generated, based, at least in part, on the solution to the differential equation. Method 400 will be discussed in more detail with reference to FIGS. 5-8E below.

Figure 5:
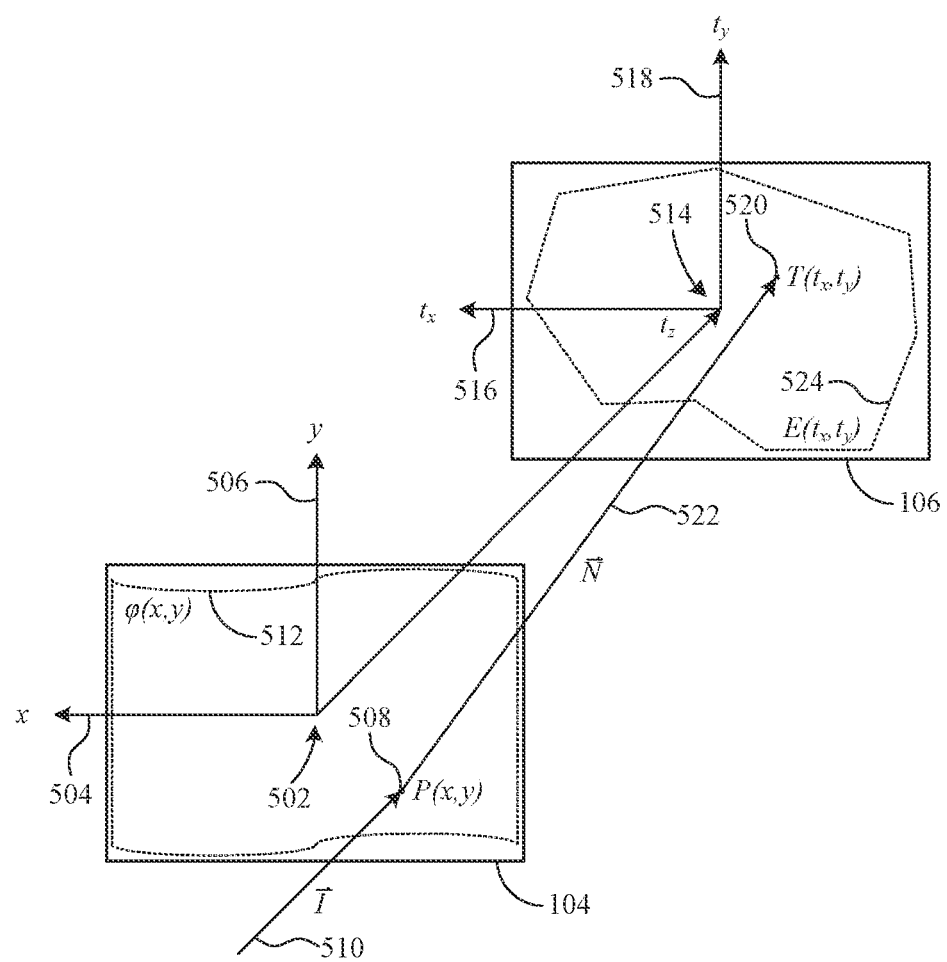
FIG. 5 is a geometric representation of surfaces of the beam-steering modulator and amplitude modulator of FIG. 1.

FIG. 5 is a geometric diagram depicting a portion of projection system 100, including beam-steering modulator 104 and amplitude modulator 106. Beam-steering modulator 104 is co-planar with a first coordinate system 502, which includes an x-axis 504 and a y-axis 506. Coordinate system 502 defines each position on the surface of beam-steering modulator 104 as a point 508, labeled P(x, y). In the example embodiment, each point P having integer valued x- and y-coordinates refers to the position of a pixel of beam-steering modulator 104. A vector 510, labeled $\vec{I}$, represents a beam of light that will form a portion the lightfield incident on beam-steering modulator 104. The incident lightfield is altered by beam-steering modulator 104, according to a phase function 512, labeled φ(x, y), which mathematically represents the beam-steering drive values used to drive beam-steering modulator 104. Phase function 512 describes changes induced in the incident lightfield by beam-steering modulator 104, which results in an image being projected onto amplitude modulator 106.

Amplitude modulator 106 is co-planar with a second coordinate system 514, which includes a $t_x$-axis 516 and a $t_y$-axis 518. Second coordinate system 514 is parallel to first coordinate system 502 and separated from first coordinate system 502 by a distance $t_z$, which is equal to the distance between beam-steering modulator 104 and amplitude modulator 106 in the example embodiment. Coordinate system 514 defines each position on the surface of amplitude modulator 106 as a point 520, labeled T($t_x$, $t_y$). In the example embodiment, each point T having integer valued $t_x$- and $t_y$-coordinates refers to the position of a pixel of amplitude modulator 106. A vector 522, labeled $\vec{N}$, represents a beam of light traveling between beam-steering modulator 104 and amplitude modulator 106. The direction of this beam of light is determined by phase function φ(x, y) 512, and the beam of light forms a portion of a desired image 524, labeled E($t_x$, $t_y$). Therefore, desired image 524 is determined by phase function 512.

Figure 6A:
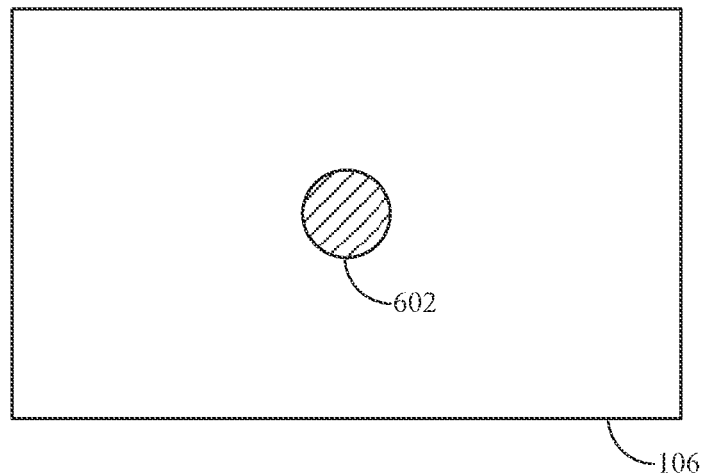
FIG. 6A is a front view of the amplitude modulator of FIG. 1 with an example desired lightfield image projected thereon.

FIG. 6A is a front view of amplitude modulator 106 with an example desired image 602 projected thereon. Desired image 602 is simply a bright circle positioned in the center of amplitude modulator 106. Desired image 602 can be mathematically expressed, as shown in FIG. 5, by the function E($t_x$, $t_y$), which outputs an intensity value based on a position input in $t_x$ and $t_y$.

Figure 6B:
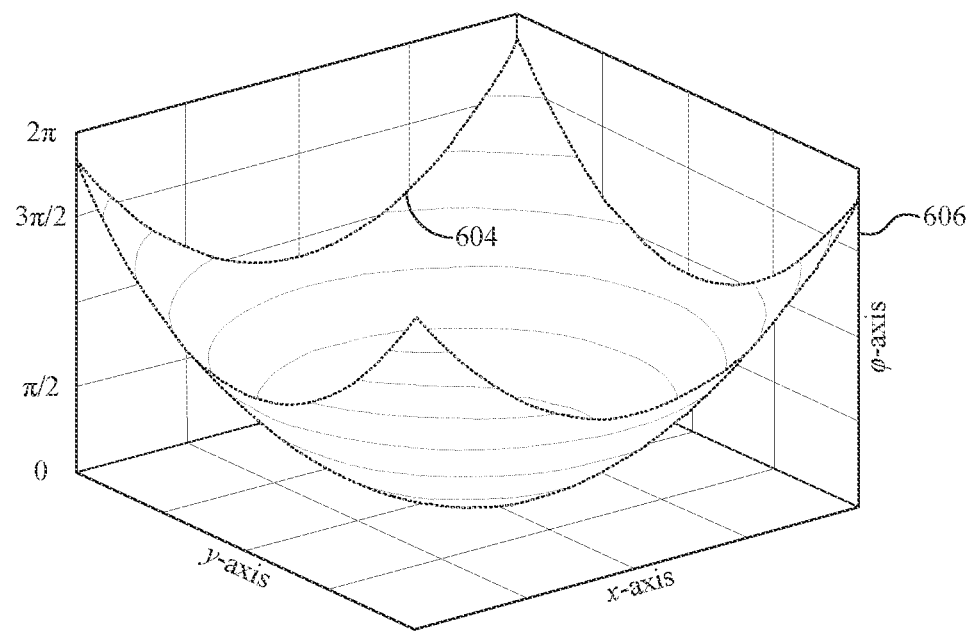
FIG. 6B is a diagram of an example phase function that generates the desired image of FIG. 6A when used to generate beam-steering drive values for driving the beam-steering modulator of FIG. 1.

FIG. 6B is a representation of an example phase function 604, that generates desired image 602 when used to generate beam-steering drive values for driving beam-steering modulator 104. Phase function 604 can be mathematically expressed, as shown in FIG. 5, by the function φ(x, y), which outputs an angle (interpreted as a phase change) based on a position input in x and y. A φ-axis 606 shows the magnitude of the phase change, which is imparted on the beam of light incident on that region, in radians.

Generally, phase function 512 (specifically, phase function 604) acts to steer light toward amplitude modulator 106, in order to form desired image 524 (desired image 602). The angle of the steered light in the x-direction and y-direction is proportional to the partial derivative of φ(x, y) with respect to x and to y, respectively. Therefore, phase function 512 effectively maps point 508 on beam-steering modulator 104 onto corresponding point 520 on amplitude modulator 106, according to the following mapping function:

$$\begin{bmatrix} t_x \\ t_y \end{bmatrix} = \begin{bmatrix} x + (t_z - \varphi(x, y))\left(-\dfrac{\partial \varphi}{\partial x}\right) \\ y + (t_z - \varphi(x, y))\left(-\dfrac{\partial \varphi}{\partial y}\right) \end{bmatrix} = M(x, y)$$

where M(x, y) maps the ordered pair (x, y), to the corresponding ordered pair ($t_x$, $t_y$) for a given phase function φ(x, y).

To determine phase function 512 and, therefore, the mapping function, a differential equation is defined. The differential equation mathematically describes aspects of the system, including the relative positions of beam-steering modulator 104 and amplitude modulator 106, the incident lightfield on beam-steering modulator 104, desired image 524, etc. Additionally, the differential equation is defined such that it embodies the minimum deflection problem/solution, in order to maximize efficiency in projection system 100.

Figure 7A:
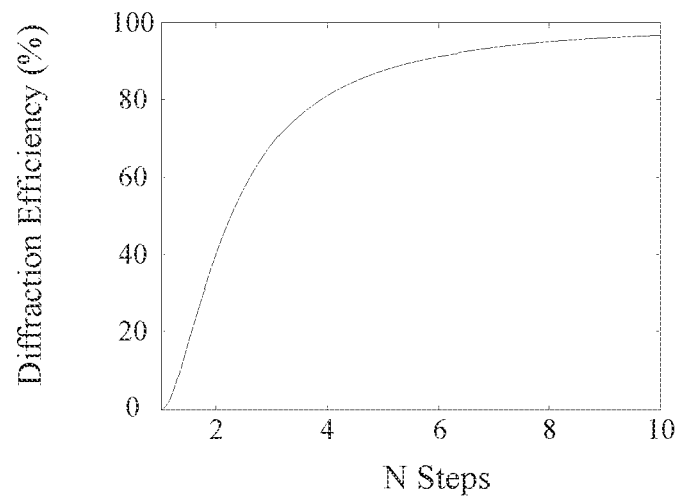
FIG. 7A is a graph illustrating the efficiency of the beam-steering modulator of FIG. 1 with respect to step number.
Figure 7B:
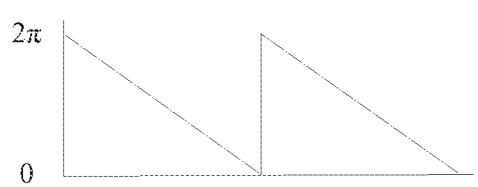
FIG. 7B is a graph illustrating the first order diffraction efficiency for a beam-steering phase modulator having an infinite number of steps (e.g., pixels) per steering element.
Figure 7C:
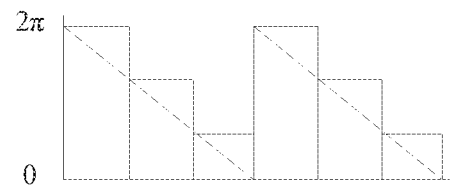
FIG. 7C is a graph illustrating the first order diffraction efficiency for a beam-steering phase modulator having 3 steps (e.g., pixels) per steering element.

FIG. 7A is a graph illustrating the efficiency of beam-steering modulator 104 with respect to step number, which is inversely proportional to steering angle. FIG. 7B is a graph illustrating the first order diffraction efficiency for a beam-steering phase modulator having an infinite number of steps (e.g., pixels) per steering element. FIG. 7C is a graph illustrating the first order diffraction efficiency for a beam-steering phase modulator having 3 steps (e.g., pixels) per steering element.

In the example embodiment, beam-steering modulator 104 is a liquid crystal spatial light modulator (SLM), which acts as a discretized grating to steer incident light by creating constructive and destructive interference in the resulting lightfield. The number of steps in the grating, shown by axis 702, determines the angle at which the incident light is steered. A higher number of steps corresponds to a straighter steering angle, for an SLM with a given fixed pixel pitch.

The graph shows that efficiency increases with the number of steps, which means that efficiency decreases with increased steering angles. Therefore, the minimum deflection problem is suitable for determining phase function 512 while maximizing the optical efficiency of projection system 100.

The differential equation utilized to determine phase function 512 is, in the example embodiment, a Monge-Ampère type, second-order differential equation, as shown below:

$$t_z^2 \left[ \frac{\partial^2 \varphi}{\partial x^2} \frac{\partial^2 \varphi}{\partial y^2} - \left( \frac{\partial \varphi}{\partial xy} \right)^2 \right] - t_z \frac{\partial^2 \varphi}{\partial x^2} - t_z \frac{\partial^2 \phi}{\partial y^2} + 1 - \frac{I(x, y)}{E(t_x(x, y), t_y(x, y))} = 0$$

Where I(x, y) describes the lightfield incident on beam-steering modulator 104 and $E(t_x(x, y), t_y(x, y))$ describes desired image 524 expressed in the x- and y-coordinates of first coordinate system 502. This equation can be approximated using a variety of computational methods, including, but not limited to, Newton's method. When solved, the differential equation provides a phase function that maps the incident lightfield onto the desired image using the smallest steering angles possible. However, in alternate embodiments different equations may be used. For example, MEMS devices and/or tip-tilt mirror devices can provide a beam-steering device that does not suffer from efficiency loss at oblique steering angles. In systems utilizing these devices, the minimum deflection problem is not necessary for optimizing efficiency, and, therefore, a different differential equation can be used.

Solving the equation above generates a plurality of different solutions. Only a specific subset of the plurality of solutions is suitable for generating a phase function that can be effectively utilized to generate beam-steering drive values. In order to determine which solutions are included in the specific subset and which solution of the subset is best, only solutions having particular boundary conditions are utilized. The boundary conditions describe a preferred boundary of desired image 524, based on the content of desired image 524, and set the value of $E(t_x(x, y), t_y(x, y))$ to zero outside of the boundary, effectively directing the steered light from beam-steering modulator 104 to the boundary and the area within the boundary only.

Figure 8A:
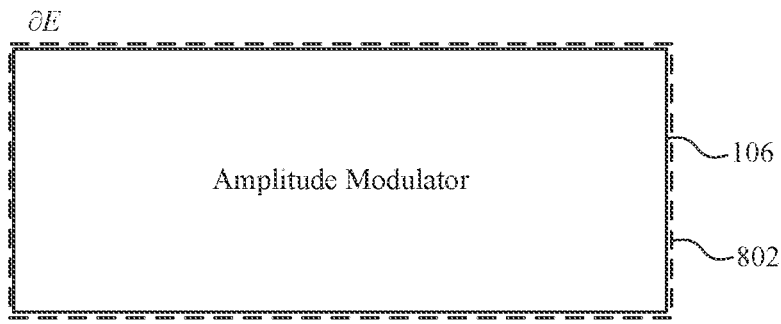
FIG. 8A is a diagram illustrating an example boundary condition that includes the entire area of the amplitude modulator of FIG. 1.
Figure 8B:
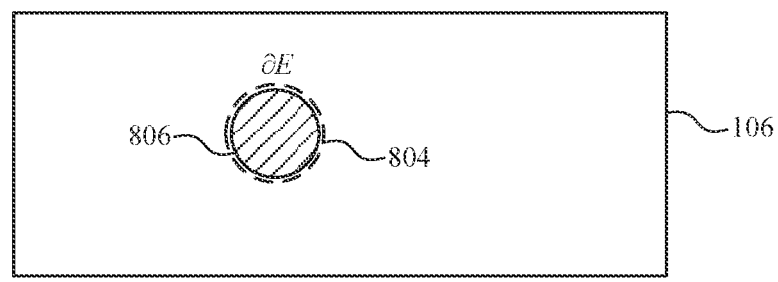
FIG. 8B is a diagram illustrating another example boundary condition, which is a simple geometrical outline of at least part of a desired image.
Figure 8C:
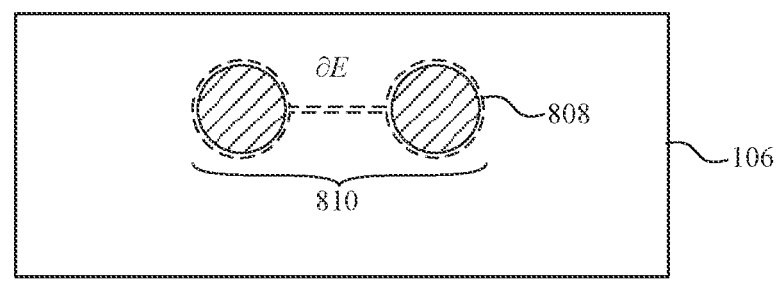
FIG. 8C is a diagram illustrating yet another example boundary condition, which is an outline of a set of objects in a desired image.
Figure 8D:
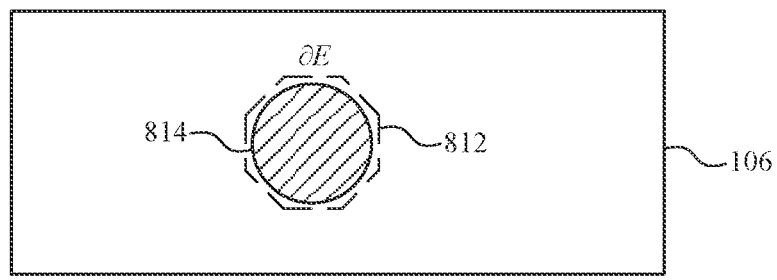
FIG. 8D is a diagram illustrating another example boundary condition, which is a piecewise linear approximation of at least part of a desired image.
Figure 8E:
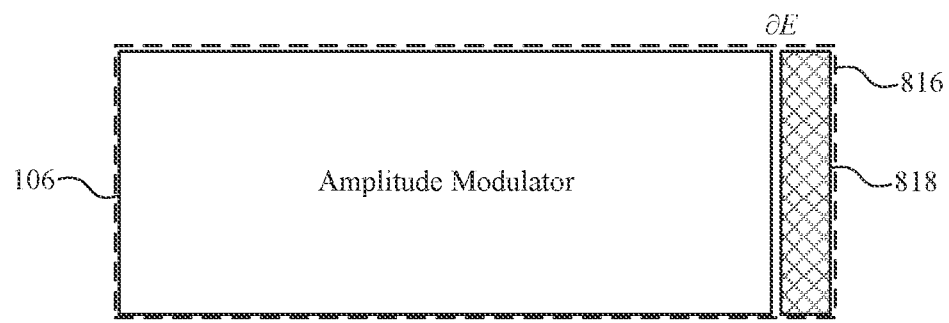
FIG. 8E is a diagram illustrating yet another boundary condition, which encompasses the amplitude modulator of FIG. 1, as well as an additional optical element.

FIGS. 8A-8E illustrate various types of boundary conditions that can be used in solving the differential equation. FIG. 8A illustrates a boundary condition 802, labeled ∂E, that encompasses the entire area of amplitude modulator 106. In this example, boundary condition 802 is essentially co-extensive with the active area of amplitude modulator 106. Boundary condition 802 is useful for solving the differential equation when desired image 524 encompasses most of the area of amplitude modulator 106 and/or when desired image 524 is mostly homogenous in intensity. FIG. 8B illustrates a boundary condition 804, which is a simple geometrical outline of at least part of a desired image 806. FIG. 8C illustrates a boundary condition 808, which is an outline of a set of objects 810 in the desired image. FIG. 8D illustrates a boundary condition 812, which is a piecewise linear approximation of at least part of a desired image 814. FIG. 8E illustrates a boundary condition 816, which encompasses amplitude modulator 106 as well as an additional optical element 818. Boundary condition 816 is useful for solving the differential equation when it is desirable to steer some of the light away from amplitude modulator 106. In the example embodiment, optical element 818 is a light dump, which is used to capture excess light that is steered away from amplitude modulator 106.

It should be noted that a boundary condition ∂I is also applied to the lightfield I(x, y). Typically, however, this boundary condition is simply a rectangular border surrounding beam-steering modulator 104. In some particular applications it may be useful to define a different boundary ∂I in solving the differential equation, such as a boundary that encompasses multiple beam-steering devices, just a portion of beam-steering modulator 104, etc. The boundary conditions are related as follows:

$$\partial I \overset{M}{\Longrightarrow} \partial E$$

Where the boundary ∂I is mapped onto the boundary ∂E via the mapping function M(x, y).

Figure 9:
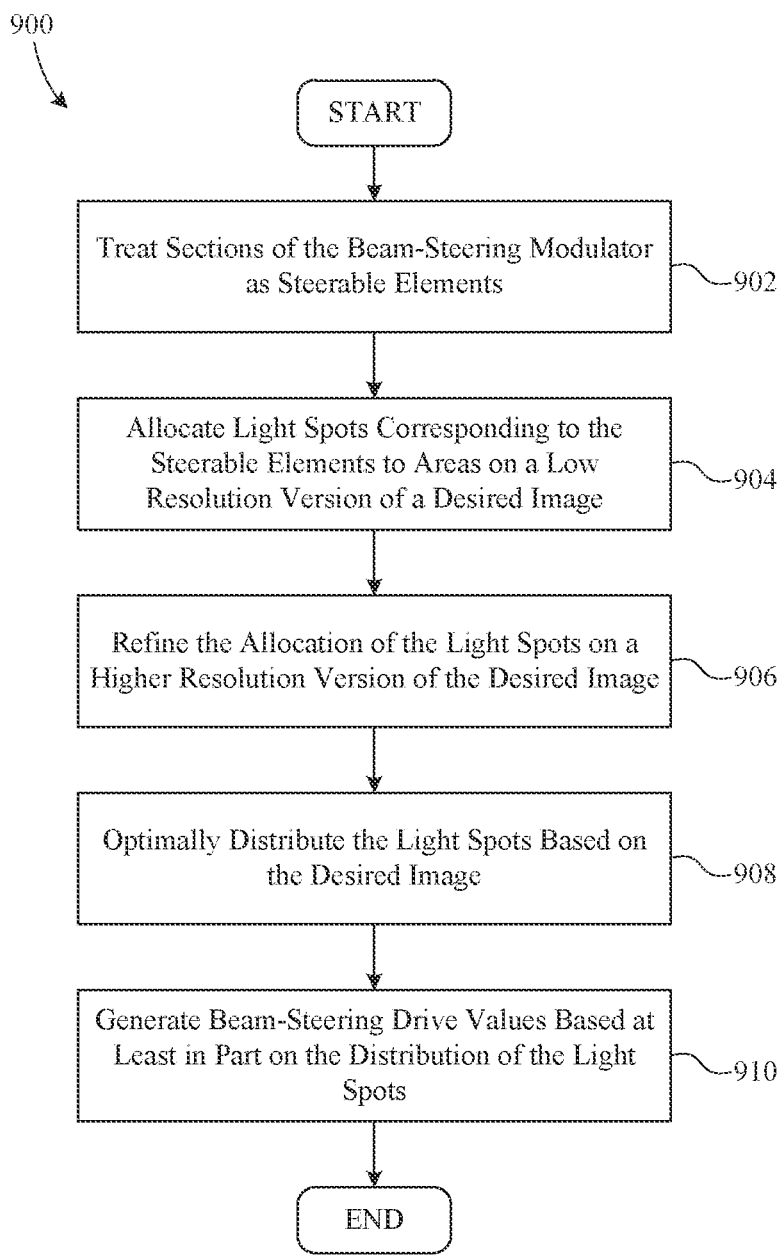
FIG. 9 is a flow chart summarizing another example method for generating beam-steering drive values from image data.

FIG. 9 is a flow chart summarizing another example method 900 for generating beam-steering drive values from image data. In the example embodiment, method 900 is performed by beam-steering drive module 224, utilizing data from other elements of controller 110. In alternate embodiments some steps of method 900 can be performed by other elements and/or system designers/users. In a first step 902, sections of the beam-steering modulator are treated as steerable elements. The sections can be individual pixels, groups of pixels, individual tiltable mirrors, etc. Then, in a second step 904, light spots corresponding to the steerable elements are allocated to areas on a low resolution version of a desired image. The desired image is determined from the image data. Next, in a third step 906, the allocation of the light spots is refined based on a higher resolution version of the desired image. In a fourth step 908, the light spots are optimally distributed based on the desired image. The distribution can be performed using, for example, the Vogel approximation method. Finally, in a fifth step 910, beam-steering drive values are generated, based, at least in part, on the distribution of the light spots. The distribution of the light spots can be used directly to generate beam-steering drive values for a multi-element mirror device. Otherwise, the distribution of the light spots can be used indirectly to generate a smooth solution for generating beam-steering drive values for a higher resolution phase modulator, such as a liquid crystal SLM. Method 900 will be discussed in more detail with reference to FIGS. 10A-10B below.

Figure 10A:
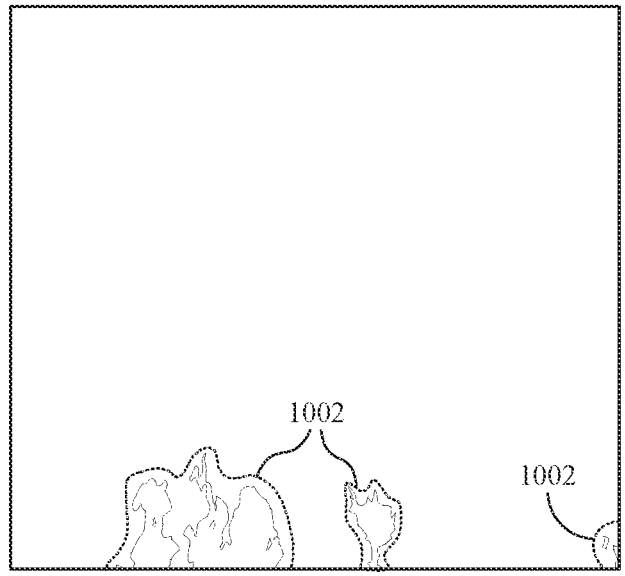
FIG. 10A is a diagram illustrating an example image to be displayed by the projection system of FIG. 1.

FIG. 10A is a diagram illustrating an example image 1000 to be displayed by projection system 100. Image 1000 is embodied digitally by image data received by controller 110 and includes several regions of interest (ROIs) 1002. ROIs 1002 are regions of image 1000 that include non-zero brightness. In the example, image 1000 depicts several small fires, the flames of which comprise ROIs 1002. In order for projection system 100 to display image 1000 with acceptable quality, light must be directed to regions of amplitude modulator 106 corresponding to ROIs 1002, using the results of method 900.

Figure 10B:
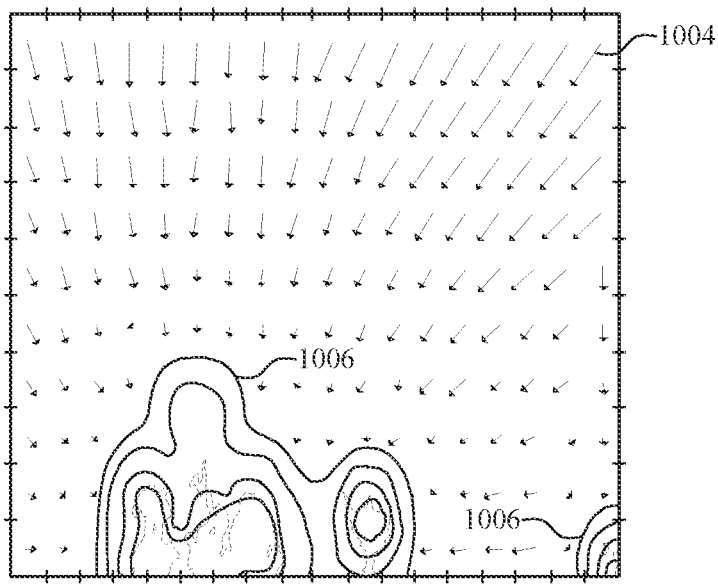
FIG. 10B is a diagram illustrating a result of the method of FIG. 9 using image data corresponding to the image of FIG. 10A.

FIG. 10B is a diagram illustrating a result of method 900 for image 1000. Image 1000 is shown with a plurality of vectors 1004 superimposed on top. Each of vectors 1004 corresponds to a region of beam-steering modulator 104, which is treated as a steerable element by beam-steering module 224. In other words, beam-steering module 224 assumes that all of the light incident on any of the regions of beam-steering modulator 104 that correspond to vectors 1004 can be steered in any direction without any loss of efficiency. Each of vectors 1004 includes a direction element and a length element. The direction element of vectors 1004 illustrates which direction the light incident on a corresponding region of beam-steering modulator 104 should be steered relative to beam-steering modulator 104 and/or amplitude modulator 106. For example, one of vectors 1004 in the upper right-hand corner of image 1000 is steered toward the lower left-hand corner of amplitude modulator 106, where the brightest of ROIs 1002 is located. (For illustrative purposes, brightness is proportional to area within ROIs 1002, in the example embodiment.) The length element of vectors 1004 illustrates how much horizontal displacement the light incident on a corresponding region of beam-steering modulator 104 should undergo relative to beam-steering modulator 104 and/or beam-steering modulator 106 (e.g., the magnitude of the steering angle). For example, the one of vectors 1004 in the upper right hand corner of image 1000 illustrates a large horizontal displacement of light incident on the corresponding region of beam-steering modulator 104, because the one of ROIs 1002, toward which it is steering light, is located a large horizontal distance away.

Vectors 1004 illustrate the allocation of light made by beam-steering module 224 according to an example of method 900. Based on image data corresponding to a low resolution version of image 1000, beam-steering module 224 allocates a light spot corresponding to one of vectors 1004 onto a ROI 1002, according to step 904 of method 900. Each of the light spots has a brightness corresponding to the amount of light incident on the corresponding region of beam-steering modulator 104. In the example embodiment, all regions of beam-steering modulator 104 corresponding to one of vectors 1004 are equal in area, and, therefore, each of the light spots has an equal brightness. Therefore, more light spots are allocated to brighter portions of ROIs 1002. At this point in method 900, none of the light spots correspond to a specific one of vectors 1004. Instead, beam-steering module 224 has simply allocated a number of light spots equal to the number of vectors 1004 (and, therefore, to the number of corresponding regions of beam-steering modulator 104). Next, beam-steering module 224 refines the allocation of the light spots based on image data corresponding to a higher resolution version of image 1000, according to step 906 of method 900, by moving the light spots short distances toward brighter portions of the higher resolution version of image 1000. Contour lines 1006 show relative brightnesses of areas on image 1000, based on the finalized allocation of light. Ones of contour lines 1006 near the centers of ROIs 1002 are brighter than ones of contour lines 1006 farther from the centers of ROIs 1002.

In order to drive beam-steering modulator 104 in the most efficient manner possible, beam-steering module 224 must optimally distribute the light spots among regions of beam-steering modulator 104, according to step 908 of method 900. To do so, beam-steering module 224 effectively solves an optimal transport problem defined by the allocation of the light spots. For example, beam-steering module 224 assigns an efficiency penalty to each of the light spots based on the horizontal displacement of the light spot with respect to the corresponding region of beam-steering modulator 104. Then, beam-steering module 224 utilizes, for example, the Vogel approximation method to determine how to distribute the light spots among the regions of beam-steering modulator 104. In other words, beam-steering module 224 matches each of the light spots to a region of beam-steering modulator 104 that will steer light to the corresponding region on amplitude modulator 106. Using the Vogel approximation, this process of matching light spots to corresponding regions of beam-steering modulator 104 results in a maximally efficient distribution. The result is illustrated by the plurality of vectors 1004, and is utilized by beam-steering module 224 to generate beam-steering drive values for beam-steering modulator 104.

Utilizing a process such as step 910 of method 900, beam-steering module 224 can generate beam-steering drive values for a wide range of beam-steering devices. As one example, beam-steering module 224 can utilize the distribution represented by vectors 1004 directly to generate drive values for a multi-element mirror device. In such an example, a x-component of each of vectors 1004 corresponds to a tilt angle of a corresponding tiltable mirror in the x-direction. Likewise, a y-component of each of vectors 1004 corresponds to a tilt angle of a corresponding tiltable mirror in the y-direction. Alternatively, beam-steering module 224 can perform a smoothing operation on the distribution generated by step 908, in order to generate beam-steering drive values for a higher resolution phase modulator, such as a liquid crystal SLM. The smoothing function can be linear or non-linear, based on user-defined settings stored in system configuration settings 218.

Figure 11:
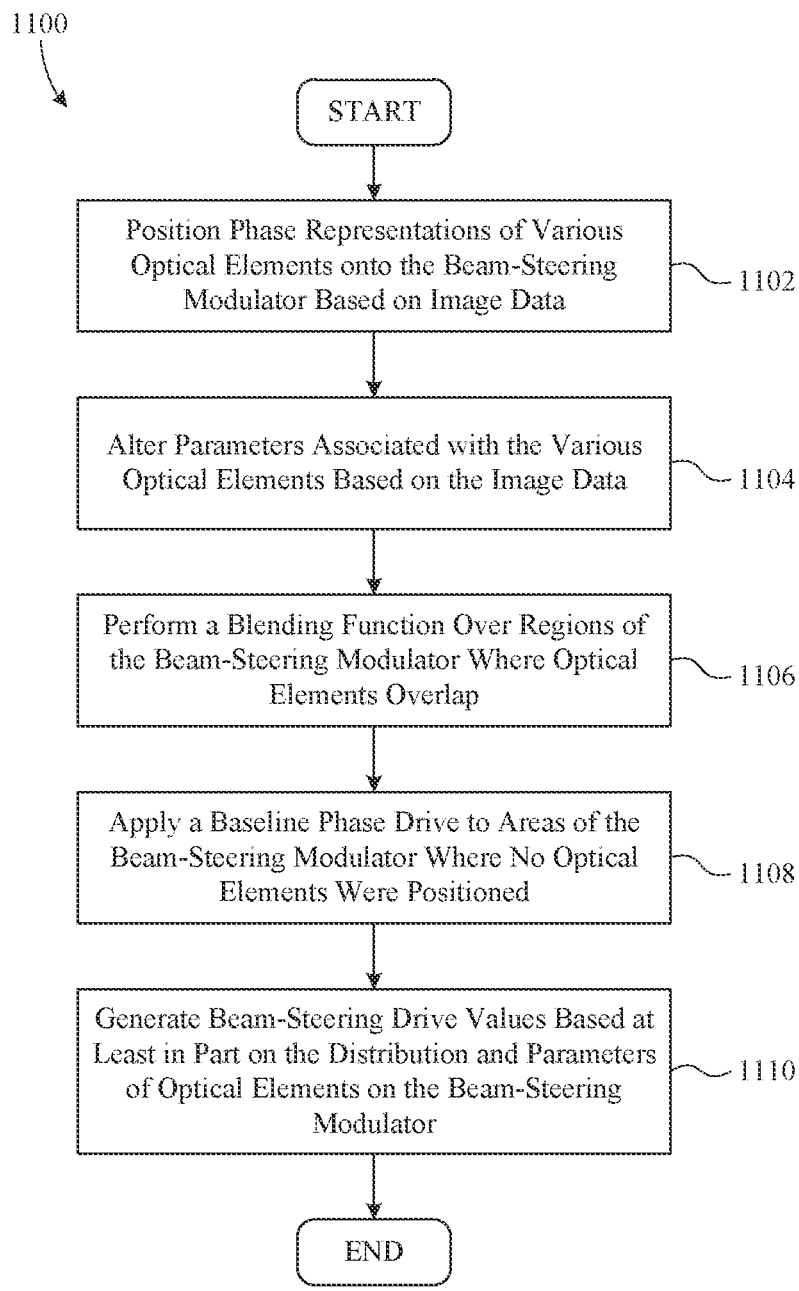
FIG. 11 is a flow chart summarizing yet another example method for generating beam-steering drive values from image data.

FIG. 11 is a flow chart summarizing another example method 1100 for generating beam-steering drive values from image data. In the example embodiment, method 1100 is performed by beam-steering drive module 224, utilizing data from other elements of controller 110. In alternate embodiments some steps of method 1100 can be performed by other elements and/or system designers/users. In a first step 1102, phase representations of various optical elements are positioned on the beam-steering modulator, based on the image data. Then, in a second step 1104, parameters associated with the various optical elements are altered, based on the image data. The parameters include, but are not limited to, such characteristics as focal length, size, magnification, etc. and can be decreased or increased as needed. Next, in a third step 1106, a blending function is performed over regions of the beam-steering modulator where optical elements overlap. The blending function can be linear or non-linear. Then, in a fourth step 1108, a baseline phase drive is applied to areas of the beam-steering modulator where no optical elements were placed during first step 1102. Finally, in a fifth step 1110, beam-steering drive values are generated, based, at least in part, on the distribution and parameter values of the optical elements on the beam-steering modulator. Method 1100 will be discussed in more detail with reference to FIGS. 12A-12H below.

Figure 12A:
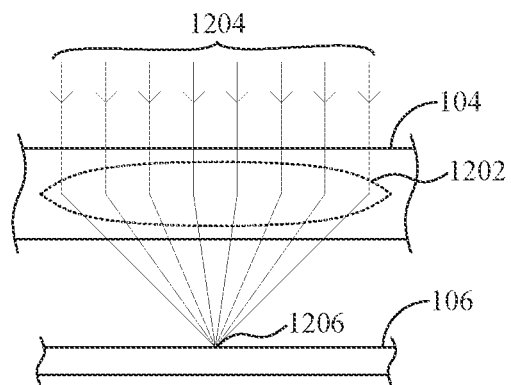
FIG. 12A is a sectional view of portions of the beam-steering modulator and the amplitude modulator of FIG. 1, showing an example phase element.
Figure 12B:
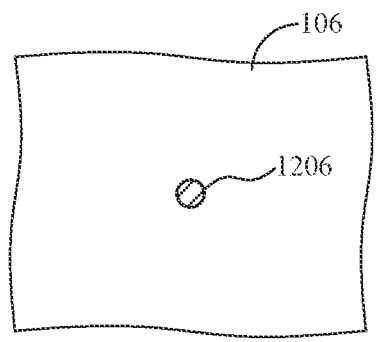
FIG. 12B shows a portion of the amplitude modulator of FIG. 1, with a desired image focused thereon.

FIG. 12A is a sectional view of portions of beam-steering modulator 104 and amplitude modulator 106, showing an example phase element 1202. Phase element 1202 is a phase representation of a convex lens, which focuses an incident lightfield 1204 to a point 1206 on amplitude modulator 106. Phase element 1202 has various adjustable parameters, such as size and focal length, which determine the exact phase drive used to generate phase element 1202. For example, one example phase element will have a relatively shorter focal length if neighboring pixels driven by that phase element have relatively larger differences in the amount of phase delay they impart on incident lightfield 1204. Conversely, another example phase element will have a relatively longer focal length if neighboring pixels have relatively smaller differences in the amount of phase delay they impart on incident lightfield 1204. FIG. 12B is a top view of a portion of amplitude modulator 106 with point 1206 shown thereon. Point 1206 is an image that results from driving beam-steering modulator 104 with a phase drive corresponding to phase element 1202.

Figure 12C:
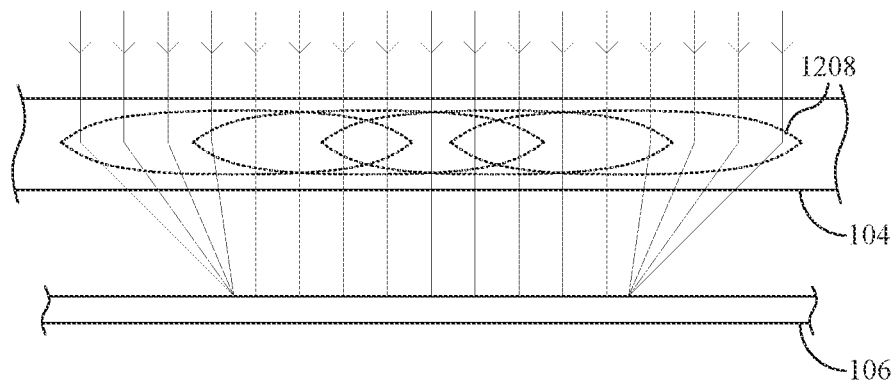
FIG. 12C is a sectional view of portions of the beam-steering modulator and the amplitude modulator of FIG. 1, showing a plurality of example phase elements.

FIG. 12C is a sectional view of portions of beam-steering modulator 104 and amplitude modulator 106, showing a plurality of example phase elements 1208. Phase elements 1208 are each substantially similar to phase element 1202 and overlap on beam-steering modulator 104. Where phase elements 1208 overlap, beam-steering modulator 104 is driven with a phase drive that corresponds to the one of phase elements 1208 having a center closest to the point of overlap. Beam steering modulator 104 can also be driven with a phase drive that corresponds to one of the phase elements 1208, or a combination of phase elements 1208 selected by linear or non-linear means. Together, phase elements 1208 drive beam-steering modulator to form an image of a line, rather than a point.

Figure 12D:
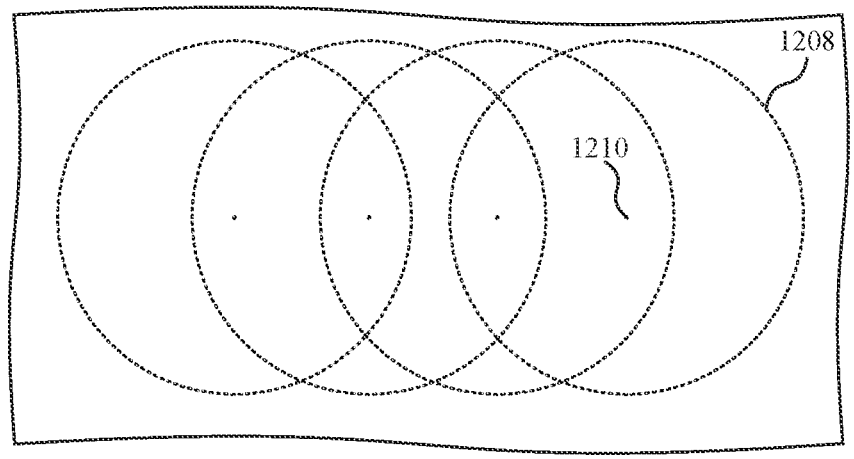
FIG. 12D is a top view of a portion of the beam-steering modulator of FIG. 1, showing the phase elements of FIG. 12C arranged therein.
Figure 12E:
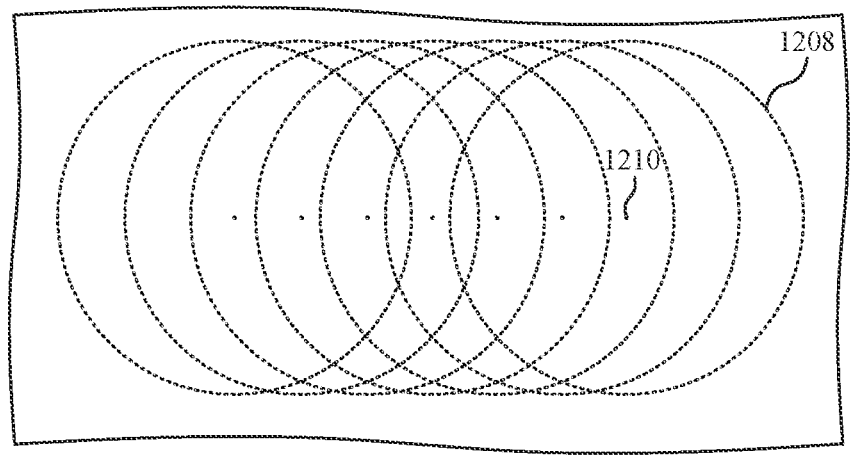
FIG. 12E is a top view of the portion of FIG. 12D of the beam-steering modulator of FIG. 1, showing a greater number of the phase elements of FIG. 12C.
Figure 12F:
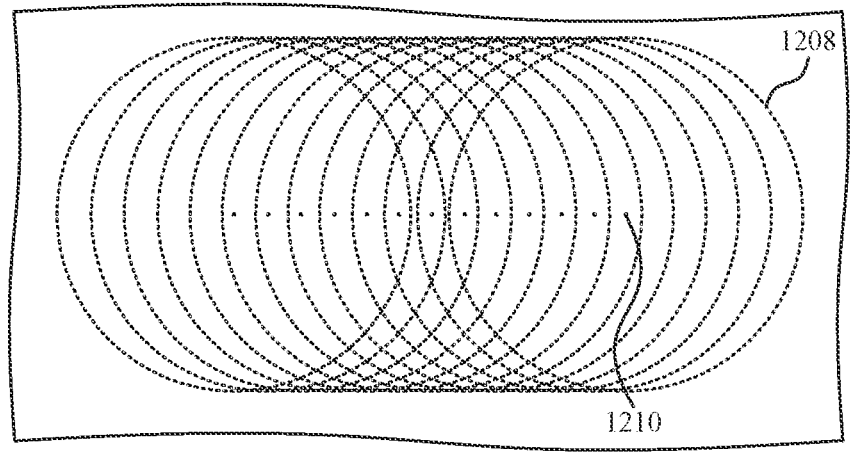
FIG. 12F is a top view of the portion of FIG. 12E of the beam-steering modulator of FIG. 1, showing an even greater number of the phase elements of FIG. 12C.
Figure 12G:
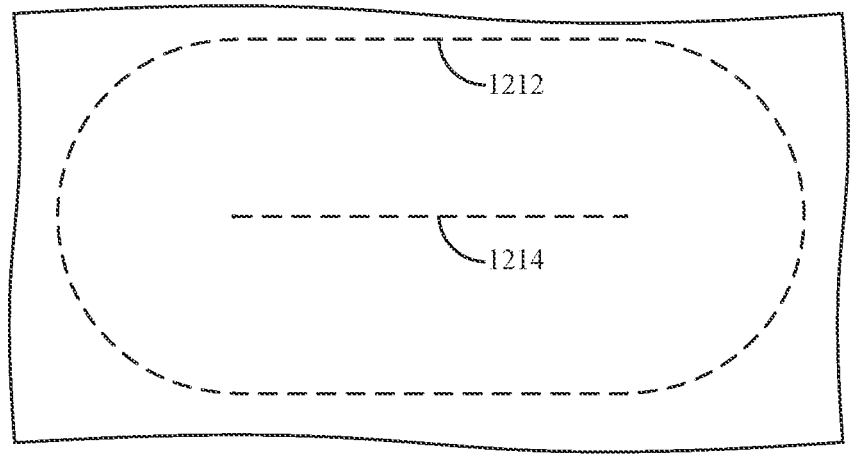
FIG. 12G is a top view of the portion of FIG. 12F of the beam-steering modulator of FIG. 1, showing a compound phase element resulting from an infinite number of the phase elements of FIG. 12C.
Figure 12H:
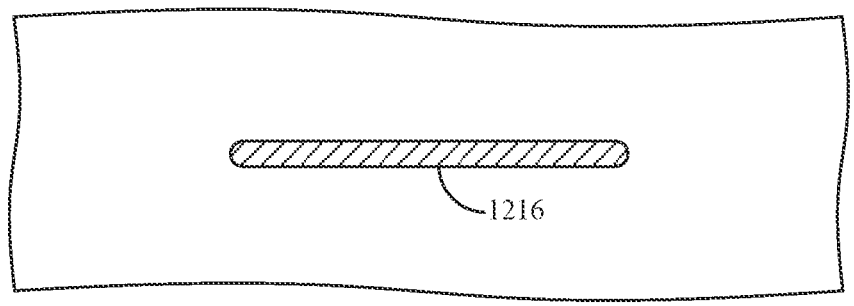
FIG. 12H is a top view of the amplitude modulator of FIG. 1 with an image formed by the compound phase element of FIG. 12 G formed thereon.

FIG. 12D is a top view of a portion of beam-steering modulator 104, showing phase elements 1208. Phase elements 1208 are arranged in a line, each having a focal point 1210. Together, focal points 1210 roughly form a line. FIG. 12E is a top view of the portion of beam-steering modulator 104 of FIG. 12D, showing more of phase elements 1208. As more of phase elements 1208 are added to the phase drive of beam-steering modulator 104, the image of the line formed on amplitude modulator 104 begins to fill in. FIG. 12F is a top view of the portion of beam-steering modulator 104 of FIG. 12E, showing even more of phase elements 1208. As a result, the line formed on amplitude modulator 104 fills in even further. FIG. 12G is a top view of the portion of beam-steering modulator 104 of FIG. 12F, showing a compound phase element 1212 resulting from the combination of an infinite number of phase elements 1208. A line 1214 in the middle of compound phase element 1212 represents a line of light that is produced when beam-steering modulator 104 is driven with compound phase element 1212. Line 1214 also corresponds to the centers of each of the infinite number of phase elements 1208 that comprise compound phase element 1212. FIG. 12H is a top view of amplitude modulator 106 with an image 1216 shown thereon. Image 1216 corresponds to line 1214.

Figure 12I:
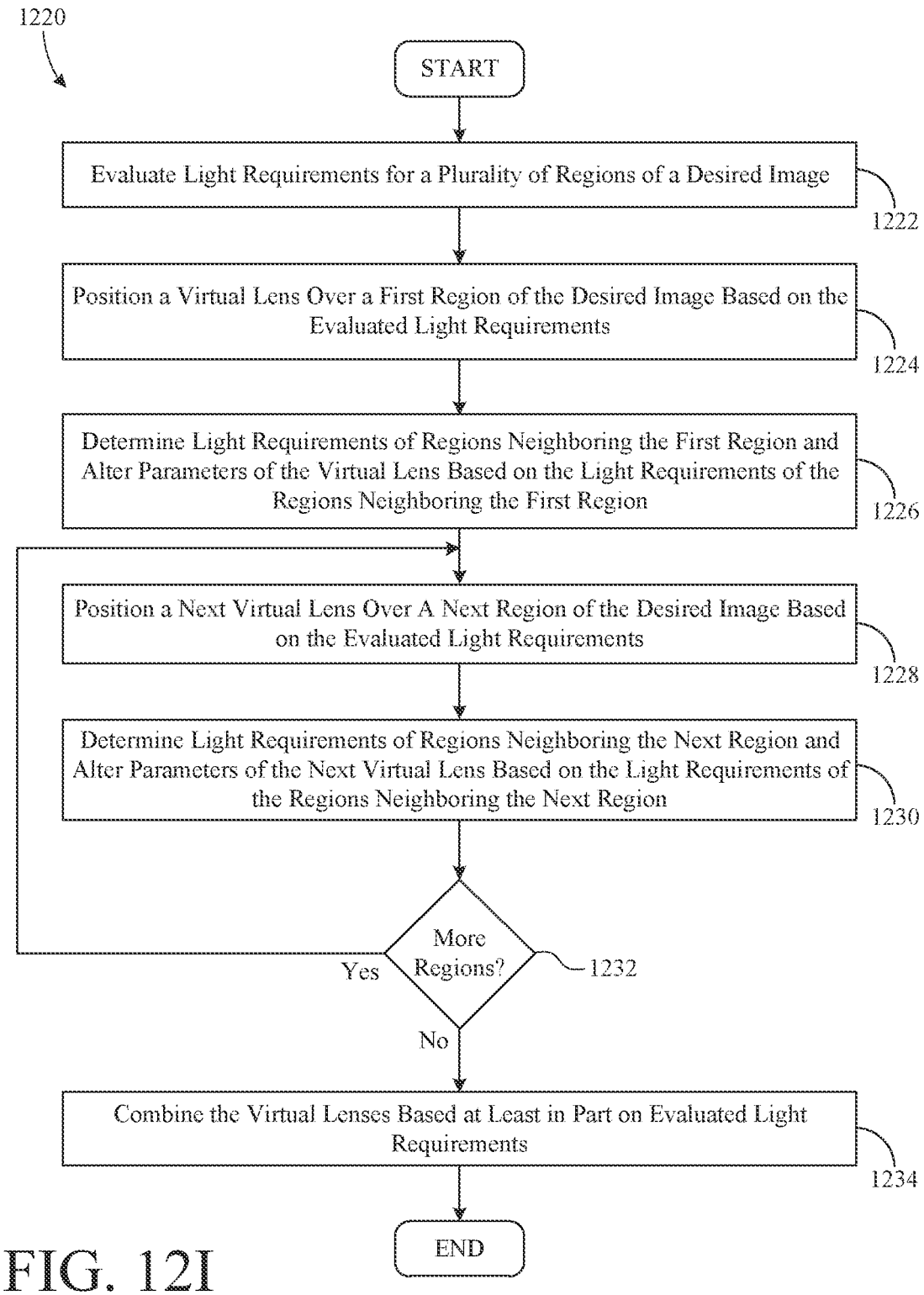
FIG. 12I is a flowchart summarizing an example method for performing the fifth step (generating beam steering drive values) of the method of FIG. 11.

FIG. 12I is a flowchart summarizing an example method for performing the fifth step 1110 (generating beam steering drive values) of method 1100 of FIG. 11. In a first step 1222, light requirements are evaluated for a plurality of regions of a desired image. Depending on the application, the plurality of regions may include a coarse array or a fine array, variable sized regions, or even pixel sized regions. In one particular example of the present invention, a Gaussian function (e.g. a function corresponding to a generic point spread function) is convolved with the image data, to generate a coarse aggregate of the brightness required in various regions of the desired image. The value (i.e. the height) of the aggregate at a given point is an indication of the brightness of that point as well as surrounding points. Next, in a second step 1224, a virtual lens (such as phase element 1202) is positioned over a first region of the desired image based on the evaluated light requirements. For example, a phase representation of a convex lens can be placed over a local maximum of the aggregate of the brightness of the desired image, because the local maximum corresponds to a relatively bright region. Then, in a third step 1226, the light requirements of regions neighboring the first region are determined and the parameters of the virtual lens are altered based on the light requirements of the neighboring regions. For example, if the first region is surrounded by relatively bright regions, the method increases the size of the virtual lens in anticipation of at least some of the area of the virtual lens being utilized to direct light towards those regions instead. Next, in a fourth step 1228, a next virtual lens is positioned over a next region of the desired image based on the evaluated light requirements. Then, in a fifth step 1230, the light requirements of regions neighboring the next region are determined and the parameters of the next virtual lens are altered based on the light requirements of the regions neighboring the next region. Next, in a decision block 1232, it is determined whether there are more regions that require a virtual lens. If there are more regions requiring a virtual lens, the method returns to step 1228. If there are no more regions requiring a virtual lens, the method continues to a final step 1234. In step 1234, the virtual lenses are combined based at least in part on the evaluated light requirements. For example, in a region where two or more virtual lenses overlap, the lens that will be utilized in the final phase drive is the one with a focal point closest to the region of overlap.

Additionally, method 1220 can be used in conjunction with a predefined phase drive for particular applications. For example, it is important when projecting relatively dim images, to be able to steer light away from amplitude modulator 106, in order to provide acceptable black levels. A predefined phase drive that directs all light away from amplitude modulator 106 can be used in these situations. Method 1220 is then performed, and any area of beam-steering modulator 106 that is not driven by a virtual lens continues to direct light according to the predefined phase drive, in this example away from amplitude modulator 106.

Figure 13:
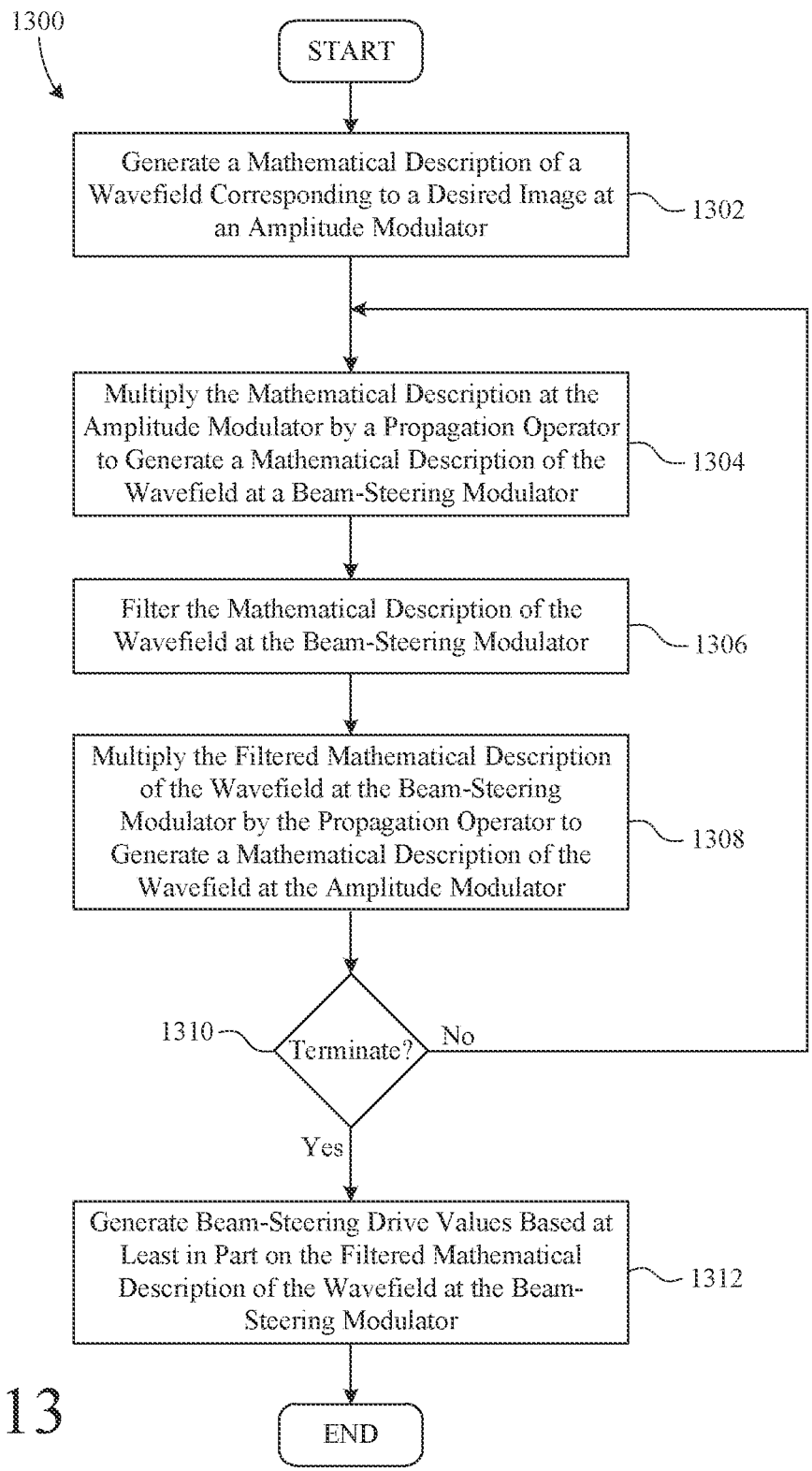
FIG. 13 is a flow chart summarizing yet another example method for generating beam-steering drive values from image data.

FIG. 13 is a flow chart summarizing yet another example method 1300 for generating beam-steering drive values from image data. In the example embodiment, method 1300 is performed by beam-steering drive module 224, utilizing data from other elements of controller 110. In alternate embodiments some steps of method 1300 can be performed by other elements and/or system designers/users. In a first step 1302, a mathematical description of a wavefield corresponding to a desired image (lightfield) at an amplitude modulator is generated. The wavefield includes an amplitude distribution that is derived from the desired image (via image data describing the desired image) and assuming zero-phase (i.e. all the light waves arriving at the amplitude modulator are in phase). Next, in a second step 1304, the mathematical description of the wavefield at the amplitude modulator is multiplied by a propagation operator to generate a mathematical description of the wavefield at a beam-steering modulator (back propagated). Then, in a third step 1306, the mathematical description of the wavefield at the beam-steering modulator is filtered. Filtering the mathematical description of the wavefield includes filtering the mathematical description using a low pass filter and removing amplitude information. Low pass filtering increases/controls diffraction efficiency of generated phase drive solutions by constraining the steering angles of the solutions to relatively small steering angles. The steering angles can be constrained to any desirable predetermined angle. The amplitude information is removed, because the beam-steering SLM is capable of phase modulation only. Next, in a fourth step 1308, the filtered mathematical description of the wavefield at the beam-steering modulator is multiplied by the propagation operator to generate a mathematical description of the wavefield at the amplitude modulator (forward propagated). Then, at a decision block 1310, it is decided whether to terminate method 1300 or to continue. Method 1300 is terminated when the mathematical description of the wavefield at the amplitude modulator is sufficiently similar to the desired image. If the termination condition is not met, method 1300 returns to step 1304. If the termination condition is met, method 1300 continues to a fifth step 1312, wherein beam-steering drive values are generated, based, at least in part, on the filtered mathematical description of the wavefield at the beam-steering modulator (as generated in the latest iteration of step 1306). Method 1300 will be discussed in more detail with reference to FIGS. 14A-14B below.

Figure 14A:
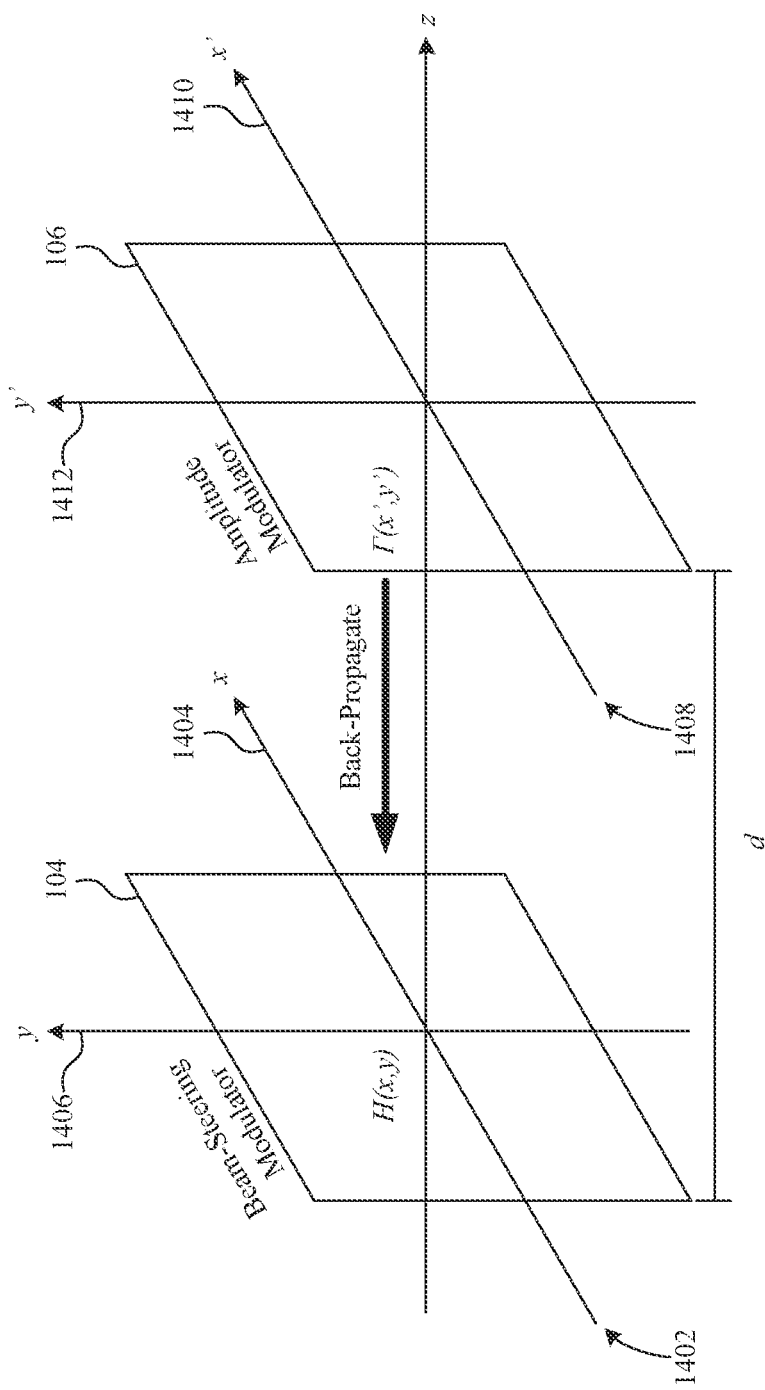
FIG. 14A is a diagram illustrating backward propagation of a wavefield between the amplitude modulator and the beam-steering modulator of FIG. 1.

FIG. 14A is a diagram illustrating backward propagation of a wavefield between amplitude modulator 106 and the beam-steering modulator 104. An emitting surface of beam-steering modulator 104 is coplanar with a first coordinate system 1402, which includes an x-axis 1404 and a y-axis 1406. A lightfield surface of amplitude modulator 106 is coplanar with a second coordinate system 1408, which is separated from first coordinate system 1402 by a distance d and includes a x'-axis 1410 and a y'-axis 1412. Beam-steering module 224 generates a function Γ(x', y'), which is a mathematical description of the desired lightfield at amplitude modulator 106, as described in step 1302 of method 1300. The function Γ(x', y') includes an amplitude distribution, which is equivalent to the intensity distribution Γ(x', y') of the desired image at amplitude modulator 106. The function Γ(x', y') is also zero-phase, in this example embodiment, because generating a random phase considerably reduces efficiency of a liquid crystal beam-steering device. In addition, the algorithm is deterministic in that it always produces the same result for a given same input image. In alternate embodiments utilizing multi-element mirror devices it is possible to use a random phase to generate the function Γ(x', y'), because there is no efficiency cost associated with steering light at oblique angles.

Next, beam-steering module 224 back-propagates the function Γ(x', y') to generate a function H(x, y), which is a mathematical description of the desired lightfield at beam-steering modulator 104, as described in step 1304 of method 1300. Beam-steering module 224 generates the function H (x, y):

$$H(x,y) = \mathcal{F}^{-1}\{F\{\Gamma(x',y')\}G_{-d}(\epsilon,\gamma)\}$$

where $\mathcal{F}\{f(x)\}$ is the Fourier transform of f(x), $\mathcal{F}^{-1}\{f(x)\}$ is the inverse Fourier transform of f(x), and $G_{\Gamma d}(\epsilon, \gamma)$ is the Rayleigh-Sommerfeld propagation operator in terms of angular frequencies and at a distance −d. In general, the Rayleigh-Sommerfeld propagation operator generates a wavefield anywhere in space that results in/from the input wavefield. In the example embodiment, the propagation operator generates the wavefield at beam-steering modulator 104 that will result in the desired image at amplitude modulator 106.

It should be noted that other propagation operators can be used based on the particular application of method 1300. The Rayleigh-Sommerfeld diffraction model is useful for applications that require a high degree of precision, because the model makes no simplifying assumptions and calculates every term of the diffraction equation. Other models, such as the Fresnel diffraction model and the Fraunhofer diffraction model make simplifying assumptions to eliminate higher order terms that do not significantly contribute to the diffraction equation in particular systems. For example, the Fresnel diffraction model calculates only the first and second order terms and is useful for situations where beam-steering modulator 104 and amplitude modulator 106 are relatively close together. Conversely, the Fraunhofer diffraction model calculates only the first order term and is useful for the situation where beam-steering modulator 104 and amplitude modulator 106 are relatively far apart.

Beam-steering module 224 filters the function H(x, y), as described in step 1306 of method 1300. Because beam-steering modulator 104 can only modulate phase and not amplitude, the wavefield at beam-steering modulator 104 must have a constant amplitude. Therefore, beam-steering module 224 sets the amplitude distribution to a constant value (1 in the example embodiment) to generate the phase function at the beam-steering modulator:

$$\tilde{H}(x,y) = \exp^{iQ(\varphi)}$$

where i is the imaginary unit and Q(φ) is the phase distribution. The phase distribution includes the angular spectrum of the wavefield at beam-steering modulator 104, which is a distribution of the various phase shifts (expressed in angular units, such as radians) that beam-steering modulator 104 introduces in the wavefield.

Figure 14B:
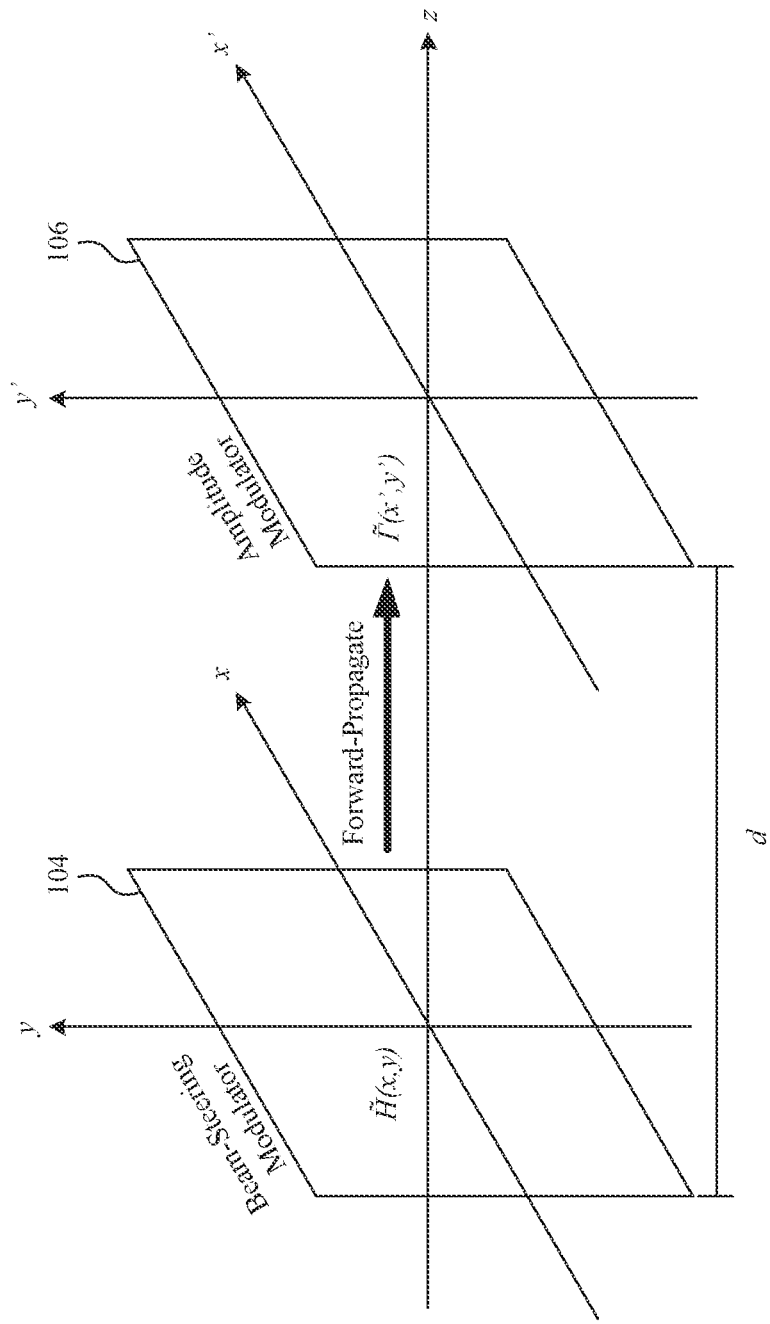
FIG. 14B is a diagram illustrating forward propagation of a wavefield between the beam-steering modulator and the amplitude modulator of FIG. 1.

FIG. 14B is a diagram illustrating the forward propagation of the phase function H(x, y) from beam-steering modulator 104 to amplitude modulator 106. First, the phase is quantized to the bit-depth of beam-steering modulator 104 to account for errors that occur from being unable to replicate the phase to arbitrary precision. Additionally, the angular spectrum is filtered to contain only angular frequencies smaller than a specified threshold $$f_t = \frac{1}{2N\Delta},$$

where N is me phase step count (FIG. 7) and Δ is the pixel pitch of beam-steering modulator 104. The wavefield at beam-steering modulator 104 is constrained by the following low-pass filter:

$$L(\epsilon, \gamma) = \begin{cases} 1 & \sqrt{\epsilon^2 + \gamma^2} < f_t \\ \frac{1}{2} & \sqrt{\epsilon^2 + \gamma^2} = f_t \\ 0 & \text{else} \end{cases}$$

where $\epsilon, \gamma \in [-f_{-max}, f_{max}]$ are the angular frequencies in the x- and y-directions, respectively, and $f_{max}$ is the maximum angular frequency achievable by beam-steering modulator 104. Beam-steering module 224 generates the filtered spectrum $F\{\tilde{H}(x, y)\}L(\epsilon, \gamma)$ by multiplying the low-pass filter into the angular spectrum of the wavefield at beam-steering modulator 104. Then, beam-steering module 224 generates a new wavefield at amplitude modulator 106, as described in step 1308 of method 1300, as follows:

$$\tilde{\Gamma}(x',y') = \mathcal{F}^{-1}\{\mathcal{F}\{\tilde{H}(x,y)\}L(\epsilon,\gamma)G_d(\epsilon,\gamma)\}$$

The wavefield $\tilde{\Gamma}(x', y')$ is an approximation of the desired image that models both the noise introduced by quantization and the phase-only nature of beam-steering modulator 104. Next, beam-steering module 224 replaces the amplitudes of the wavefield $\tilde{\Gamma}(x', y')$ with the original intensity distribution I(x', y') and utilizes $\tilde{\Gamma}(x', y')$ to begin the next iteration of method 1300.

Compensation for relative tilt between the beam-steering modulator and the amplitude modulator can also be provided. For example, a rotation in the angular spectrum can provide such compensation. See, for example, S. De Nicola, A. Finizio, G. Pierattini, D. Alfieri, P. Ferraro, "Reconstruction of digital holograms on tilted planes", Proc. SPIE 6311, Optical Information Systems IV, 63110K (2006/08/30); doi: 10.1117/12.683859; http://dx.doi.org/10.1117/12.683859, which is incorporated herein by reference. Then, the propagation operation, filtering, and angular rotation can all be performed in the same angular spectrum. As a result, the the tilt compensation can be performed at no additional complexity cost.

Beam-steering module 224 terminates method 1300 when a particular predetermined termination condition is met. In the example embodiment, method 1300 is terminated when the total power of the wavefield at beam-steering modulator 104 does not increase past a predefined threshold between consecutive iterations. At every iteration j, the total power is calculated over the ROIs of the image (every pixel in the reconstructed wavefield where the corresponding pixel in the original image isn't black). The power is calculated as follows:

$$M(x, y) = \begin{cases} 1 & I(x, y) \neq 0 \\ 0 & \text{else} \end{cases}$$

$$P_j = \sum_x \sum_y |\tilde{H}(x, y)|^2 M(x, y)$$

Beam-steering module 224 terminates method 1300 when the following condition is met:

$$\frac{|P_j - P_{j-1}|}{P_j} < P_t$$

where $P_t$ is the relative power increase between iterations and is chosen empirically. After the termination condition is met, it may be desirable to continue to perform iterations without filtering, as follows:

$$\tilde{\Gamma}(x',y') = \mathcal{F}^{-1}\{\mathcal{F}\{\tilde{H}(x,y)\} G_d(\in,\gamma)\}$$

At this point, each successive iteration will add improvements to the quality of the reconstructed image at the expense of an efficiency penalty. Once the unfiltered iterations are terminated, beam-steering module 224 extracts the phase of the final version of $\tilde{H}(x, y)$ and quantizes it to the bit-depth of beam-steering modulator 104. Beam-steering module 224 then utilizes the resulting phase distribution to generate beam-steering drive values for driving beam-steering modulator 104, as described in step 1312 of method 1300.

Several variations of method 1300 can also be used to generate beam-steering drive values, based on particular efficiency needs, image quality requirements, etc. For example, the low pass filter $L(\in, \gamma)$ can be trivially adjusted to generate a solution that does not steer light at specified angles, as follows:

$$L(\in, \gamma) = \begin{cases} 1 \sqrt{\epsilon^2 + \gamma^2} < f_t \\ \frac{1}{2}\sqrt{\epsilon^2 + \gamma^2} = f_t \\ 0 \sqrt{\epsilon^2 + \gamma^2} = f_1 \\ \vdots \\ 0 \sqrt{\epsilon^2 + \gamma^2} = f_N \\ 0 \quad \text{else} \end{cases}$$

where $0 \leq f_1 < \ldots < f_N \leq f_t$ and $f_1 \ldots f_N$ are selected based on the particular needs of the application. Such a variation can be useful for systems where it is desirable to block DC-frequency light, such as reflections from the surface of beam-steering modulator 104. In addition, other types of filters including, but not limited to, Gaussian filters, sinc filters, and so on.

Another variation includes altering a filter $L_M(\in, \gamma)$ after successive iterations. For example, the initial filter $L_0(\in, \gamma)$ can be set as follows:

$$L_0(\epsilon, \gamma) = \begin{cases} 1 \sqrt{\epsilon^2 + \gamma^2} < f_0 \\ \frac{1}{2}\sqrt{\epsilon^2 + \gamma^2} = f_0 \\ 0 \quad \text{else} \end{cases}$$

where $f_0$ is chosen to maximize the diffraction efficiency of beam-steering modulator 104. After each iteration, the efficiency constraint is progressively relaxed. This allows beam-steering module 224 to test the reconstructed image for visual quality metrics after each iteration and to terminate method 1300 when the image quality is deemed acceptable as compared to predefined quality requirements. As another variation, the filter cut-off threshold can be derived from computing an F(efficiency)=quality estimator curve for a given input image (prior to running the iteration algorithm) and selecting the best compromise between efficiency and quality.

Yet another variation includes utilizing a pre-calculated phase drive instead of zero-phase for the initial phase distribution of the function $\Gamma(x', y')$. For example, another of the methods described in this disclosure can be used to generate a low-resolution phase-drive, which is then forward propagated, according to step 1308 of method 1300. The resulting propagated field can then be used as the function $\Gamma(x', y')$ for step 1304 of method 1300. Additionally, the filter threshold $f_t$ can be chosen so that the diffraction efficiency of the resulting solution is no worse than the initial, low-resolution phase drive.

Figure 15:
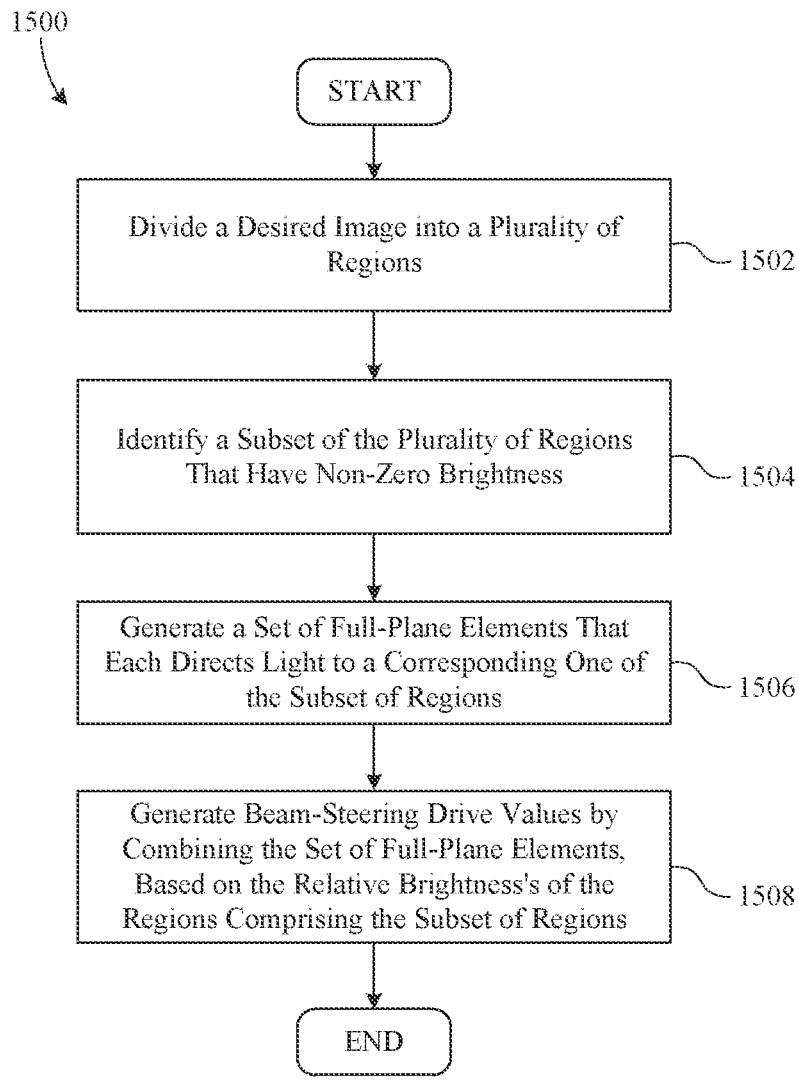
FIG. 15 is a flow chart summarizing another example method for generating beam-steering drive values from image data.

FIG. 15 is a flow chart summarizing another example method 1500 for generating beam-steering drive values from image data. In the example embodiment, method 1500 is performed by beam-steering drive module 224, utilizing data from other elements of controller 110. In alternate embodiments some steps of method 1500 can be performed by other elements and/or system designers/users. In a first step 1502, a desired image (based on the image data) is divided into a plurality of regions. Next, in a second step 1504, a subset of the plurality of regions that have non-zero brightness is identified. Then, in a third step 1506, a set of full-plane elements that each directs light to a corresponding one of the subset of regions is generated. Finally, in a fourth step 1508, beam-steering drive values are generated by combining the set of full-plane elements, based, at least in part, on the relative brightnesses of the regions comprising the subset of regions. Method 1500 will be discussed in more detail with reference to FIG. 16 below.

Figure 16:
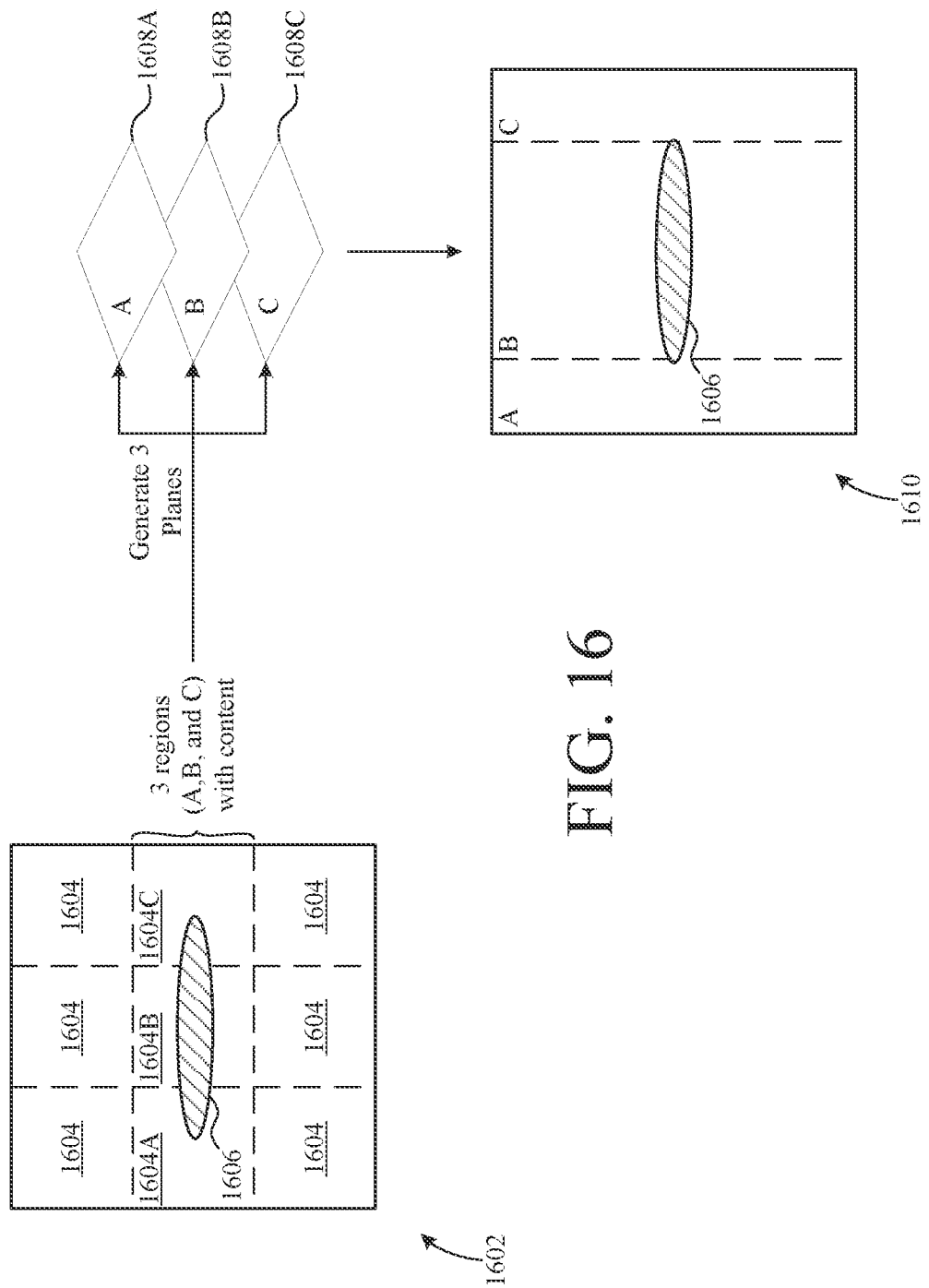
FIG. 16 is a diagram illustrating one example of the method of FIG. 15.

FIG. 16 is a diagram illustrating method 1500. A desired image 1602 is divided into a plurality of regions 1604. Three of regions 1604, labeled 1604A, 1604B, and 1604C, contain areas of non-zero brightness (indicated by an image of an ellipsoid 1606). Beam-steering module 224 identifies regions 1604A, 1604B, and 1604C as having non-zero brightness by examining the image data corresponding to desired image 1602, as described in step 1504 of method 1500. For regions 1604A, 1604B, and 1604C, beam-steering module 224 generates full-plane drive values 1608A, 1608B, and 1608C, respectively, as described in step 1506 of method 1500. Full-plane drive values 1608 can be pre-calculated or generated in real time utilizing any of the other example methods for generating beam-steering drive values as discussed in this disclosure.

Each of full-plane drive values 1608 would generate just the corresponding region 1604 on amplitude modulator 106 when used to drive the entire (full-plane) beam-steering modulator 104. For example, if full-plane drive values 1608A are used to drive beam-steering modulator 104, the portion of ellipsoid 1606 within region 1604A will be the only thing displayed on amplitude modulator 106. The portion of ellipsoid within region 1604A will also be displayed at the same location and to the same scale as in desired image 1602. Beam-steering module 224 combines full-plane drive values 1608, as described in step 1508 of method 1500, to generate beam-steering drive values that will drive beam-steering modulator 104 to generate a recreated image 1610 on amplitude modulator 106. Recreated image 1610 is as similar to desired image 1602 as is possible given the capabilities of beam-steering modulator 104.

When combining full-plane drive values 1608, beam-steering module 224 must allocate portions of beam-steering modulator 104 based on the relative brightnesses of regions 1604. Brighter ones of regions 1604 require more light to be illuminated properly, so they require that more of the area of beam-steering modulator 104 direct light toward them. In the example embodiment, ellipsoid 1606 has uniform brightness across its area, so the relative brightnesses of regions 1604A, 1604B, and 1604C depend on the relative areas of ellipsoid 1606 within them. Approximately one-fifth of ellipsoid 1606 is contained within each of regions 1604A and 1604C, while the other three-fifths are contained within region 1604B. Therefore, the final beam-steering drive values will comprise one-fifth of each of full-plane drive values 1608A and 1608C and three-fifths of full-plane drive values 1608B, as shown on recreated image 1610. To determine which areas of beam-steering modulator 104 should be driven to illuminate a particular one of regions 1604A, 1604B, or 1604C, an optimal transport problem (such as that utilized in method 900) is solved by beam-steering module 224. The solution to the optimal transport problem generates a set of beam-steering drive values that recreate image 1602 with maximum efficiency.

The example embodiment illustrated by FIG. 16 is simplified to provide a clear understanding of method 1500. In practical embodiments, the resolution of regions 1604 will be much higher, and in some cases as high as the resolution of desired image 1602. In such embodiments beam-steering module 224 analyzes the image data corresponding to desired image 1602 to determine which pixels have non-zero brightnesses. For each of these pixels, full-plane drive values are generated, each of the full-plane drive values being a phase representation of a lens that directs the entire incident lightfield onto a corresponding pixel. When the full-plane drive values are combined, beam-steering module 224 utilizes the image data corresponding to desired image 1602 to determine the relative brightnesses of the pixels, and, therefore, the relative areas of beam-steering modulator 104 dedicated to directing light onto the pixels, thus, automatically generating recreated image 1610 with an appropriate intensity distribution. Again, an optimal transport solution is generated to allocate areas of beam-steering modulator 104 for maximum efficiency.

As indicated above, the Vogel approximation method is advantageous because it provides a near-optimal solution to the transportation problem (light allocation) in both methods 900 and 1500. The method ensures the proximity of the beam-steering SLM partitions allocated to the same (or near same) PSF locations in the lightfield, in 2D space. This limits the diffraction loss potentially caused by having too many switches between partitions steering to different locations, which can look like a "block-artifact". The method also ensures locality of the beam-steering SLM partitions with respect to the target position, which limits deflection angles and, therefore, diffraction losses.

Optionally, a multi-resolution Vogel approximation method (MRVAM) can be used in method 900 and/or method 1500. The MRVAM solves the transportation (optical) problem using multiple levels of resolution. First, the problem is solved on a coarse grid (e.g., 30×18 partitions) generating a first approximation solution. Then, the solution is refined on a finer grid (e.g., 120×72), using the result of the first approximation and allowing the fine solution to span the equivalent of a 3×3 "coarse region." This method facilitates solving much more complicated systems, while keeping computational complexity low.

Figure 17:
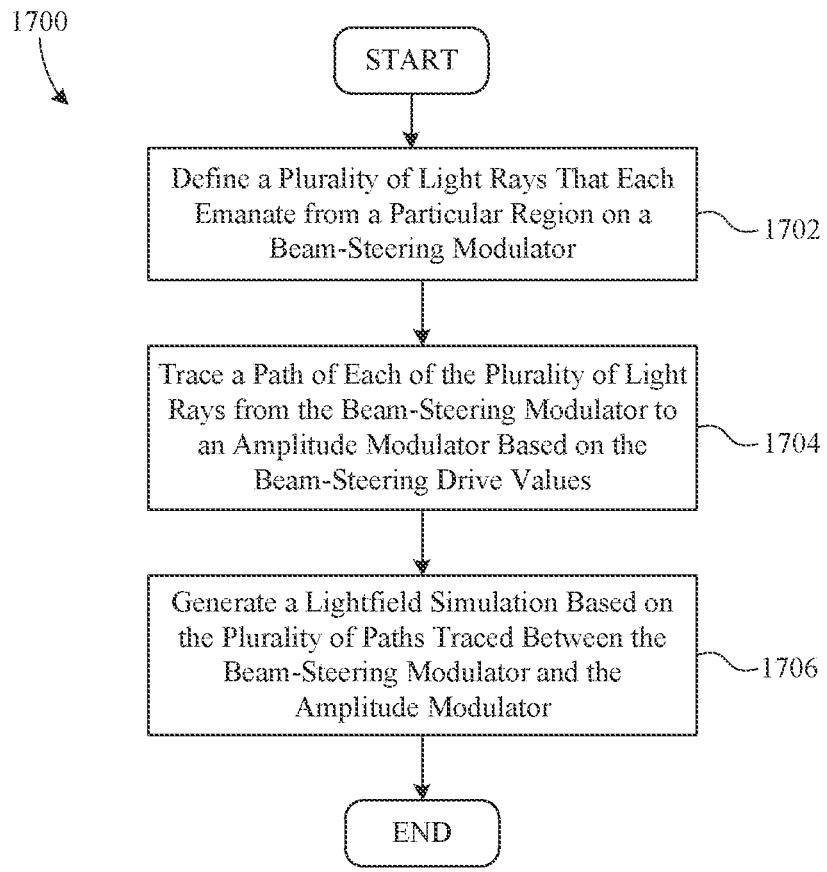
FIG. 17 is a flow chart summarizing an example method for generating a lightfield simulation based on a set of beam-steering drive values.

FIG. 17 is a flow chart summarizing an example method 1700 for generating a lightfield simulation based on a set of beam-steering drive values. In the example embodiment, method 1700 is performed by lightfield simulation module 226, utilizing data from other elements of controller 110. In alternate embodiments some steps of method 1700 can be performed by other elements and/or system designers/users. In a first step 1702, a plurality of light rays is defined. Each ray of the light rays emanates from a particular point/region on a beam-steering modulator. Then, in a second step 1704, the path of each ray of the plurality of light rays is traced from the beam-steering modulator to an amplitude modulator, based at least in part on the beam-steering drive values. Finally, in a third step 1706, a lightfield simulation is generated, based, at least in part, on the plurality of paths traced between the beam-steering modulator and the amplitude modulator. Method 1700 will be discussed in more detail with reference to FIGS. 18-19B below.

Figure 18:
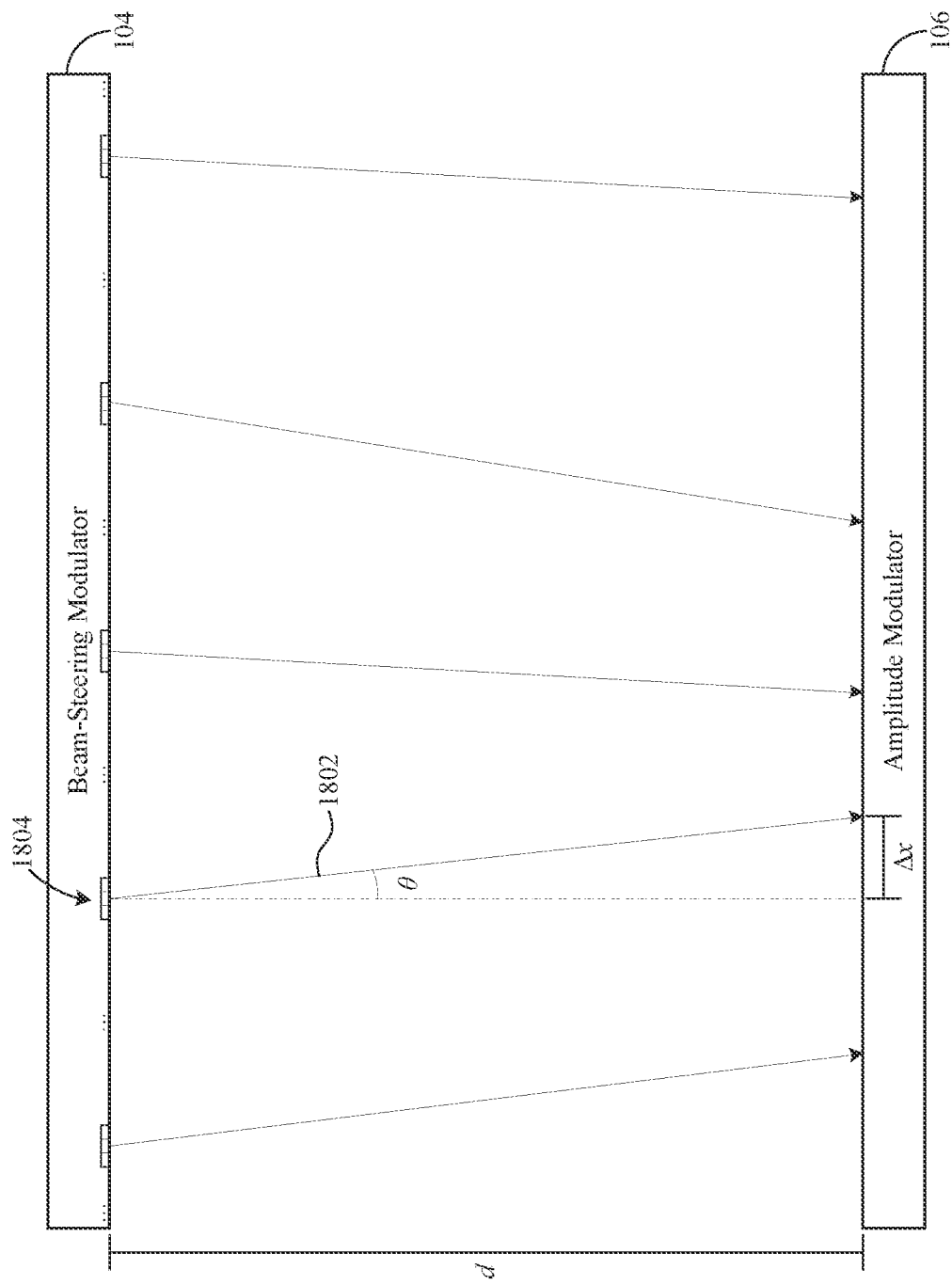
FIG. 18 is a sectional view of the beam-steering modulator and the amplitude modulator of FIG. 1, illustrating one example of the method of FIG. 17.

FIG. 18 is a sectional view of beam-steering modulator 104 and amplitude modulator 106, illustrating method 1700. A plurality of light rays 1802 emanate from beam-steering modulator 104 and are incident on amplitude modulator 106. Each of light rays 1802 emanates from one of a plurality of pixel groups 1804. In the example embodiment, each of pixel groups 1804 includes a 3×3 square of pixels (only three pixels are visible, because FIG. 18 only shows one dimension), and a corresponding one of light rays 1802 emanates from the center pixel. Based on the beam-steering drive values used to drive beam-steering modulator 104, lightfield simulation module 226 is able to determine an angle θ between each of light rays 1802 and the normal to beam-steering modulator 104. A horizontal displacement of each of light rays 1802 in one direction can be determined from θ, as follows:

$$\Delta x = d \sin \theta_x$$

where $\Delta x$ is the horizontal displacement in the x-direction, $\theta_x$ is the angle between a relevant one of light rays 1802 and the normal to beam-steering modulator 104 in the x-direction, and d is the distance between beam-steering modulator 104 and amplitude modulator 106. Likewise, the horizontal displacement in the y-direction can be determined, as follows:

$$\Delta y = d \sin \theta_y$$

where $\Delta y$ is the horizontal displacement in the y-direction and $\theta_y$ is the angle between a relevant one of light rays 1802 and the normal to beam-steering modulator 104 in the y-direction. A discretized vector field $\vec{D}(x, y)$ that describes the three-dimensional displacement of each of light rays 1802 emanating from a point (x, y) on beam-steering modulator 104 is defined, as follows:

$$\vec{D}_{(x,y)} = d\sin[\theta_x(x,y)]\hat{x} + d\sin[\theta_y(x,y)]\hat{y} + d\hat{z}$$

where $\theta_x$ and $\theta_y$ are each functions of the origin positions of corresponding light rays 1802 and are defined by the beam-steering drive values, and $\hat{x}$, $\hat{y}$, and $\hat{z}$ are the unit vectors in the x-, y-, and z-directions, respectively. Vector field $\vec{D}(x, y)$ maps light rays 1802 from beam-steering modulator 104 to amplitude modulator 106 and, thus, is utilized by lightfield simulation module 226 to generate a lightfield simulation, as described in step 1706 of method 1700. Vector field $\vec{D}(x, y)$ can also be expressed as a mapping from coordinates (x, y) to coordinates (x', y') as follows:

$$\begin{bmatrix} x' \\ y' \end{bmatrix} = \begin{bmatrix} x + d\sin[\theta_x(x, y)] \\ y + d\sin[\theta_y(x, y)] \end{bmatrix}$$

This is useful for determining the Jacobian matrix that corresponds to the system, discussed in further detail below, with reference to FIGS. 19A-19B.

Figure 19A:
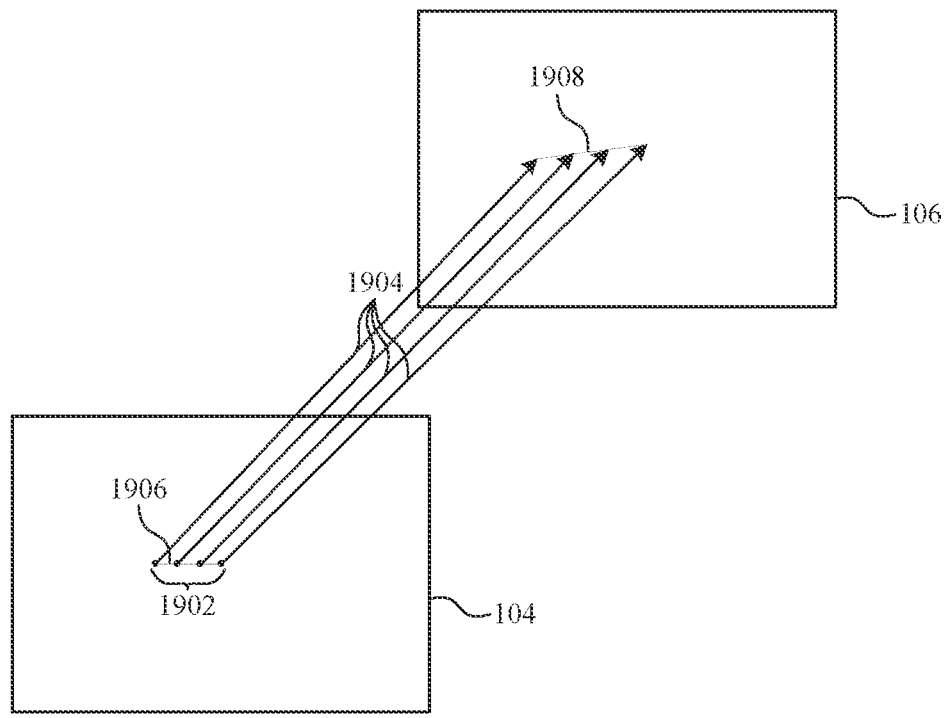
FIG. 19A is a diagram illustrating a variation (translation of a line element) of the method of FIG. 17.

FIG. 19A is a diagram illustrating a variation of method 1700. Beam-steering modulator 104 includes four pixels 1902, which are the origin points of four light rays 1904, that are incident on amplitude modulator 106. Lightfield simulation module 226 traces light rays 1904 by tracking changes to a line element 1906, which is defined by pixels 1902. Line element 1906 is mapped to a corresponding line element 1908 on amplitude modulator 106, which is defined by the destination points of light rays 1904. Lightfield simulation module 226 utilizes the Jacobian matrix corresponding to system 100 to determine how much length element 1906 is stretched, compressed, rotated, displaced, etc.

The Jacobian is defined, in system 100, as the following matrix:

$$J = \begin{bmatrix} \dfrac{\partial x'}{\partial x} & \dfrac{\partial x'}{\partial y} \\ \dfrac{\partial y'}{\partial x} & \dfrac{\partial y'}{\partial y} \end{bmatrix}$$

where the destination point of a given one of light rays 1904 is given by (x', y') and x' and y' are each a function of x and y (because $\theta_x$ and $\theta_y$ are each a function of x and y). The determinant of the Jacobian provides information about how the coordinate system corresponding to (x, y) maps onto the coordinate system corresponding to (x', y') at a given point (x, y). In the example embodiment, the determinant of the Jacobian provides information about how light rays travel between beam-steering modulator 104 and amplitude modulator 106. For example, the length of the line element 1908 at a given point is stretched out if the determinant of the Jacobian is positive at that point and by a factor equal to the absolute value of the determinant of the Jacobian at that point. Utilizing the determinant of the Jacobian, lightfield simulation module 226 can sample various points (x, y) and determine what the lightfield at a corresponding point (x', y') will look like (e.g. dimmer or brighter). Utilizing the determinant of the Jacobian allows lightfield simulation module 226 to simulate the lightfield on amplitude modulator 106 using fewer calculations.

Figure 19B:
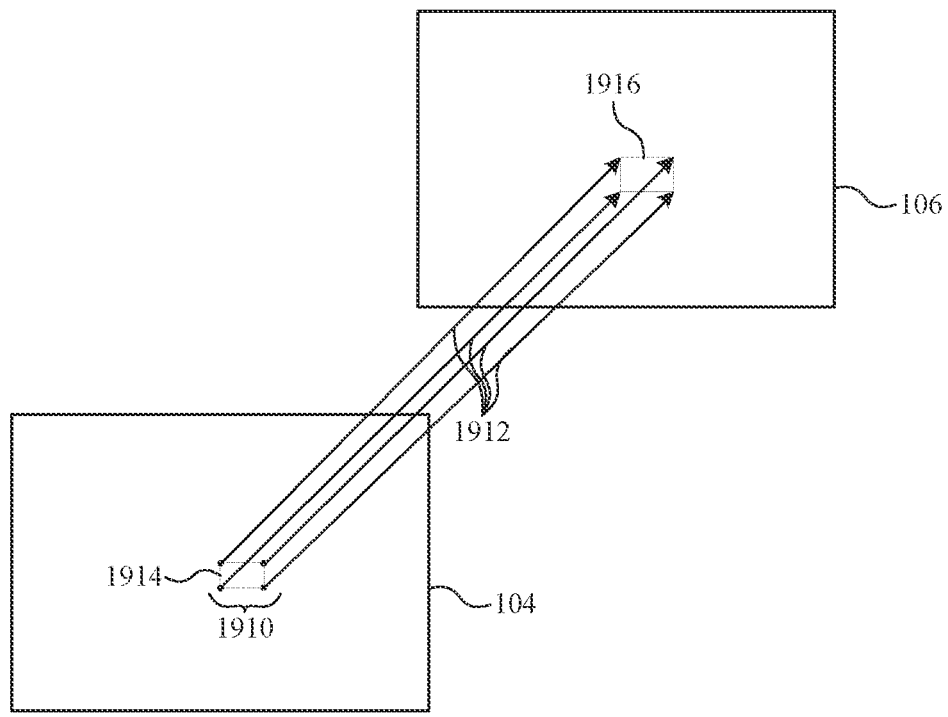
FIG. 19B is a diagram illustrating another variation (translation of an area element) of the method of FIG. 17.

FIG. 19B is a diagram illustrating another variation of method 1700. Beam-steering modulator 104 includes four pixels 1910, which are the origin points of four light rays 1912. Lightfield simulation module 226 traces light rays 1912 by tracking changes to an area element 1914, which is defined by pixels 1910. Area element 1914 is mapped to a corresponding area element 1916 on amplitude modulator 106, which is defined by the destination points of light rays 1912. Lightfield simulation module 226 utilizes the Jacobian matrix corresponding to system 100 to determine how much area element 1906 is stretched, compressed, rotated, displaced, etc.

In alternate embodiments, other matrices (e.g. the Hessian matrix) utilizing higher order differentials can be used to track changes to line element 1906 and/or area element 1914 more precisely. Additionally, more or fewer points (x, y) can be sampled by lightfield simulation module 226 based on the needs of the particular application.

Figure 20:
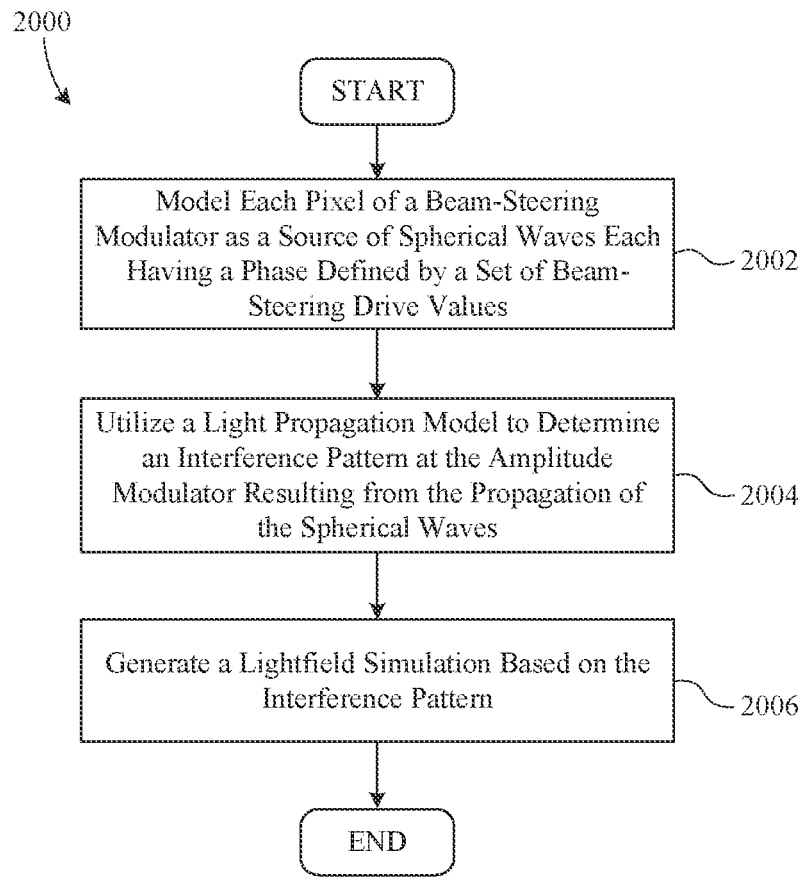
FIG. 20 is a flow chart summarizing another example method for generating a lightfield simulation based on a set of beam-steering drive values.

FIG. 20 is a flow chart summarizing another example method 2000 for generating a lightfield simulation based on a set of beam-steering drive values. In the example embodiment, method 2000 is performed by lightfield simulation module 226, utilizing data from other elements of controller 110. In alternate embodiments some steps of method 2000 can be performed by other elements and/or system designers/users. In a first step 2002, each pixel of a beam-steering modulator is modeled as a source of spherical waves. Each spherical wave has a phase defined by the set of beam-steering drive values. Then, in a second step 2004, a light propagation model is utilized to determine an interference pattern at an amplitude modulator that results from the propagation of the spherical waves. Finally, in a third step 2006, a lightfield simulation is generated based, at least in part, on the interference pattern. Method 2000 will be discussed in more detail with reference to FIG. 21 below.

Figure 21:
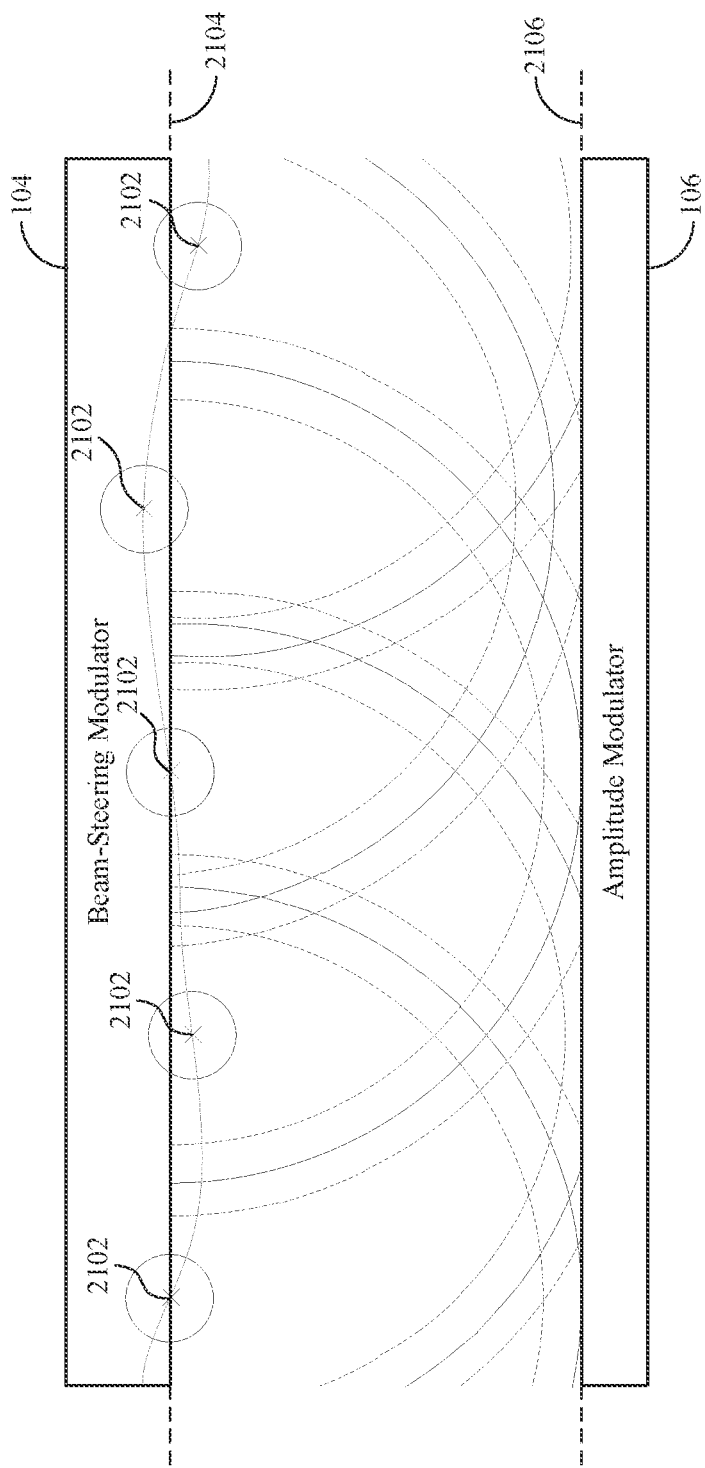
FIG. 21 is a sectional view of the beam-steering modulator and the amplitude modulator of FIG. 1, illustrating a concept of the method of FIG. 20.

FIG. 21 is a sectional view of beam-steering modulator 104 and amplitude modulator 106 illustrating method 2000. Beam-steering modulator 104 is a phase modulator, which effectively steers light by spatially modulating the phase of incident light to produce an interference pattern. Lightfield simulation module 226 simulates the lightfield by calculating the generated interference pattern based on the beam-steering drive values. Lightfield simulation module 226 treats points on beam-steering modulator 104 as sources 2102 of spherical waves, as described in step 2002 of method 2000. The phase differences between sources 2102 are illustrated as slight differences in the point of origin of the waves. In reality, sources 2102 are positioned on a surface 2104 of beam-steering modulator 104 and generate spherical waves having different phases. The spherical waves combine to generate the interference pattern on a surface 2106 of amplitude modulator 106.

Lightfield simulation module 226 utilizes a wave-based light propagation model, such as the Rayleigh-Sommerfeld model to calculate the interference pattern. Other models, such as the Fresnel-Kirchoff model can be used. Various light propagation models make various simplifying assumptions (or none at all) to approximate a lightfield based on the phase and positions of sources 2102. Lightfield simulation module 226 utilizes the model that best suits the particular situation/application to calculate the interference pattern and generates the lightfield simulation based on the calculation of the interference pattern, as described in step 2006 of method 2000.

Figure 22:
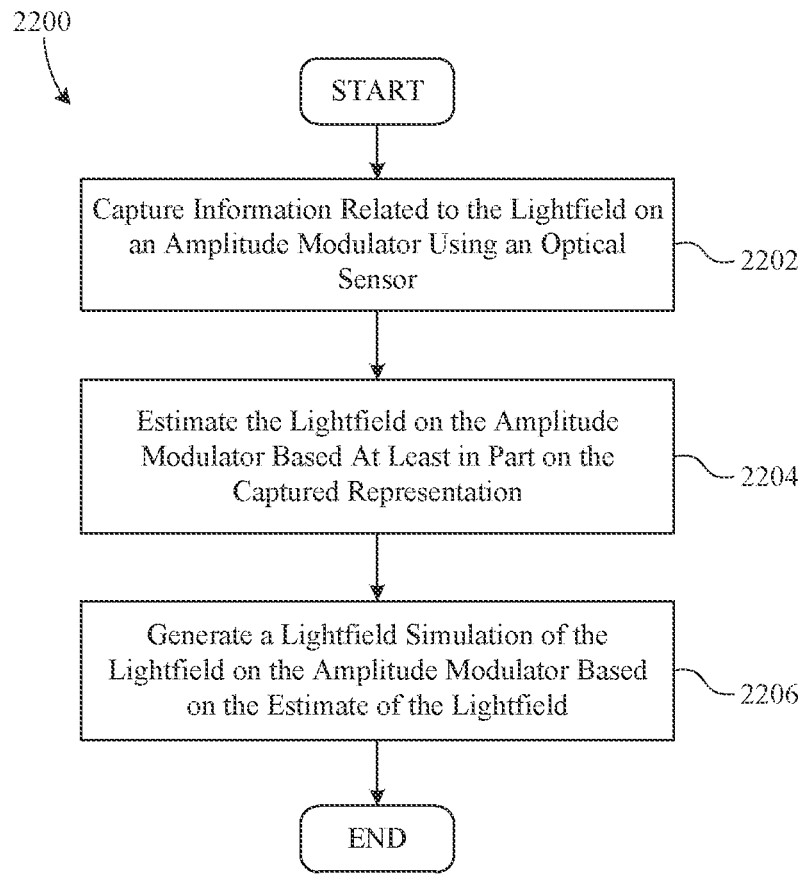
FIG. 22 is a flow chart summarizing yet another example method for generating a lightfield simulation based on a set of beam-steering drive values.

FIG. 22 is a flow chart summarizing yet another example method 2200 for generating a lightfield simulation based on a set of beam-steering drive values. In the example embodiment, method 2200 is performed by lightfield simulation module 226, utilizing data from other elements of controller 110. In alternate embodiments some steps of method 2200 can be performed by other elements and/or system designers/users. In a first step 2202, information related to the lightfield on an amplitude modulator is captured using an optical sensor. Then, in a second step 2204, the lightfield on the amplitude modulator is estimated, based, at least in part, on the captured information. Finally, in a third step 2206, a lightfield simulation of the lightfield on the amplitude modulator is generated, based, at least in part, on the estimate of the lightfield. Method 2200 will be discussed in more detail with reference to FIGS. 23A-24 below.

Figure 23A:
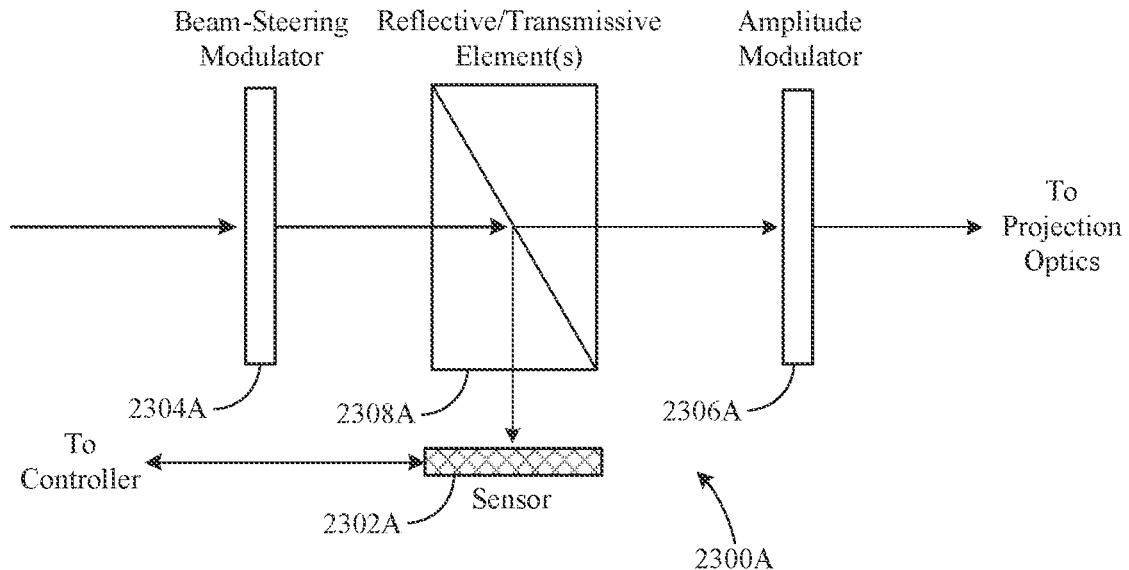
FIG. 23A is a block diagram of an example projection system utilizing an optical sensor to implement the method of FIG. 22.

FIG. 23A is a block diagram of an example projection system 2300A utilizing a sensor 2302A to implement one example of method 2200. A beam-steering modulator 2304A, based on a set of beam-steering drive values, modulates incident light to generate a lightfield to be projected onto an amplitude modulator 2306A. The lightfield is incident on one or more reflective/transmissive element(s) 2308A, which split(s) the lightfield. A first portion of the lightfield is transmitted and is incident on amplitude modulator 2306A. A second portion of the lightfield is reflected and is incident on and captured by sensor 2302A, as described in step 2202 of method 2200. Information from sensor 2302A (indicative of the lightfield incident on amplitude modulator 2306A) is provided to a controller (not shown) to be utilized in generating a lightfield simulation of the lightfield incident on amplitude modulator 2306A, as described in step 2206 of method 2200. In the example embodiment, reflective/transmissive element(s) 2308A are placed intentionally for the purpose of sampling the lightfield. In alternate embodiments, reflective/transmissive element(s) 2308A can be an existing optical element, such as a lens, a total internal reflectance (TIR) prism, an SLM coverglass, etc.

Figure 23B:
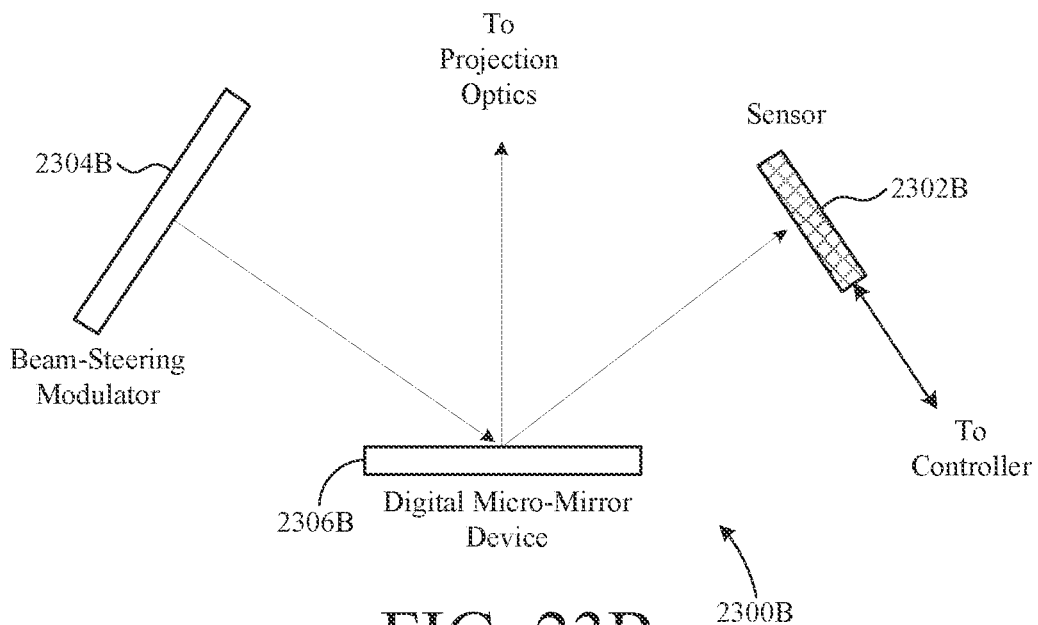
FIG. 23B is a block diagram of another example projection system utilizing an optical sensor to implement the method of FIG. 22.

FIG. 23B is a block diagram of another example projection system 2300B utilizing a sensor 2302B to implement method 2200. A beam-steering modulator 2304B modulates incident light, based on a set of beam-steering drive values, to generate a lightfield to be projected onto a digital micromirror device (DMD) 2306B. DMD 2306B directs at least a portion of the lightfield onto sensor 2302B as off-state light and directs another portion of the lightfield to projection optics (not shown). Information from sensor 2302B (indicative of the lightfield incident on DMD 2306B) is provided to a controller (not shown) to be utilized in generating a lightfield simulation of the lightfield incident on DMD 2306B, as described in step 2206 of method 2200.

Figure 23C:
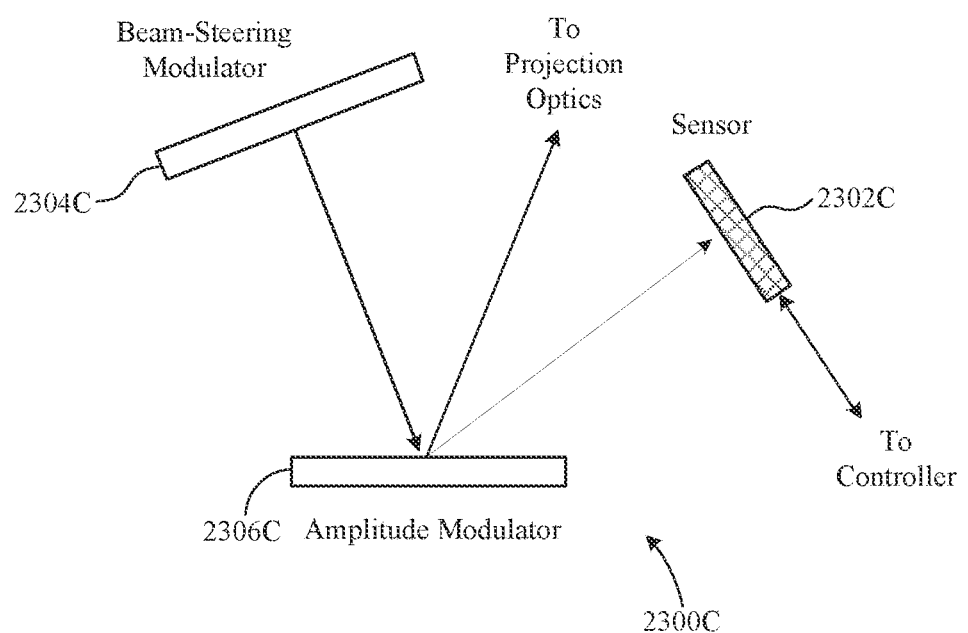
FIG. 23C is a block diagram of yet another example projection system utilizing an optical sensor to implement the method of FIG. 22.

FIG. 23C is a block diagram of yet another example projection system 2300C utilizing a sensor 2302C to implement method 2200. A beam-steering modulator 2304C modulates incident light, based on a set of beam-steering drive values, to generate a lightfield and project the lightfield onto an amplitude modulator 2306C. Sensor 2302C is positioned to sample light from at least one refraction order from amplitude modulator 2306C. Information from sensor 2302C (indicative of the lightfield incident on amplitude modulator 2306C) is provided to a controller (not shown) to be utilized in generating a lightfield simulation of the lightfield incident on amplitude modulator 2306C, according to step 2206 of method 2200.

It should be noted that the controllers of systems 2300A, 2300B, and 2300C are each substantially similar to controller 110 of system 100. The controllers each include a lightfield simulation module (not shown) substantially similar to lightfield simulation module 226 for generating the lightfield simulation based on the information received from sensors 2302A, 2302B, and 2302C, respectively.

Figure 24:
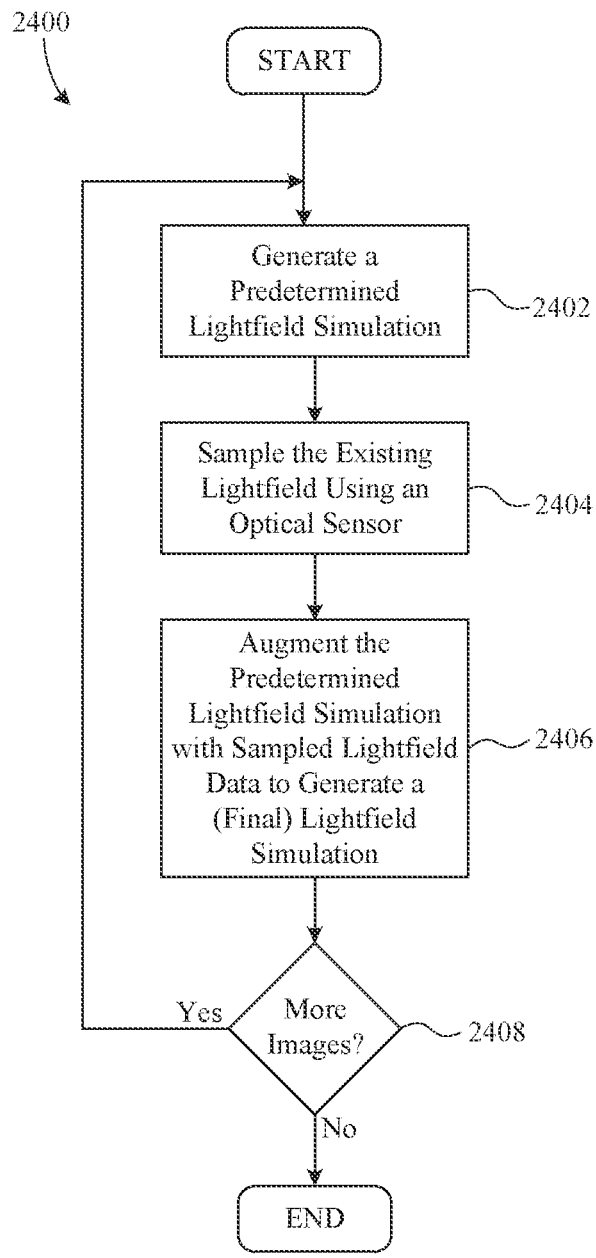
FIG. 24 is a flow chart summarizing an example method for improving latency while generating a lightfield simulation from beam-steering drive values and image data.

Because the lightfield simulated in method 2200 is also used to generate the simulation, in some systems it may be desirable to minimize latency in generating the lightfield simulation. FIG. 24 is a flow chart summarizing an example method 2400 for improving latency while generating a lightfield simulation from beam-steering drive values and image data. In a first step 2402, a predetermined lightfield simulation is generated. The predetermined lightfield simulation can be estimated at various levels of accuracy using any of the other methods, or variations thereof, described in the present disclosure. The predetermined lightfield simulation can also be a final solution from a previous frame if the image data is video data. Then, in a second step 2404, the existing lightfield is sampled using an optical sensor to generate sampled lightfield data. The existing lightfield can be sampled by any of the methods previously discussed or by other methods, even those yet to be invented. Then, in a third step 2406, the predetermined lightfield simulation is augmented with the sampled lightfield data from step 2404 to generate a final lightfield simulation. Next, in a decision block 2408, it is determined whether or not there are more images to be displayed. If there are more images to be displayed, method 2400 returns to step 2402, where the final lightfield simulation from step 2406 can be used to generate the predetermined lightfield simulation. If there are no more images to be displayed, method 2400 is terminated. Method 2400, in any incarnation, can be applied at refresh rates that are higher than the refresh rate of the content to be displayed.

Method 2400 can be utilized, for example, in combination with a DMD to generate the final lightfield simulation during, for example, blanking periods. The predetermined lightfield simulation is a blank image, or a zero-intensity distribution. The DMD is driven with a zero drive during the blanking period, which causes the entire existing lightfield to be steered toward the optical sensor as off-state light. The optical sensor samples the existing lightfield and generates the final lightfield simulation directly from the sampled lightfield data. This example method simulates the lightfield exactly (it is effectively taking a picture of the lightfield) and can be easily carried out within the maximum latency period of most projection systems. Additionally, this example method is particularly useful for systems, in which a zero drive is provided to the DMD as part of the default driving scheme.

Figure 25:
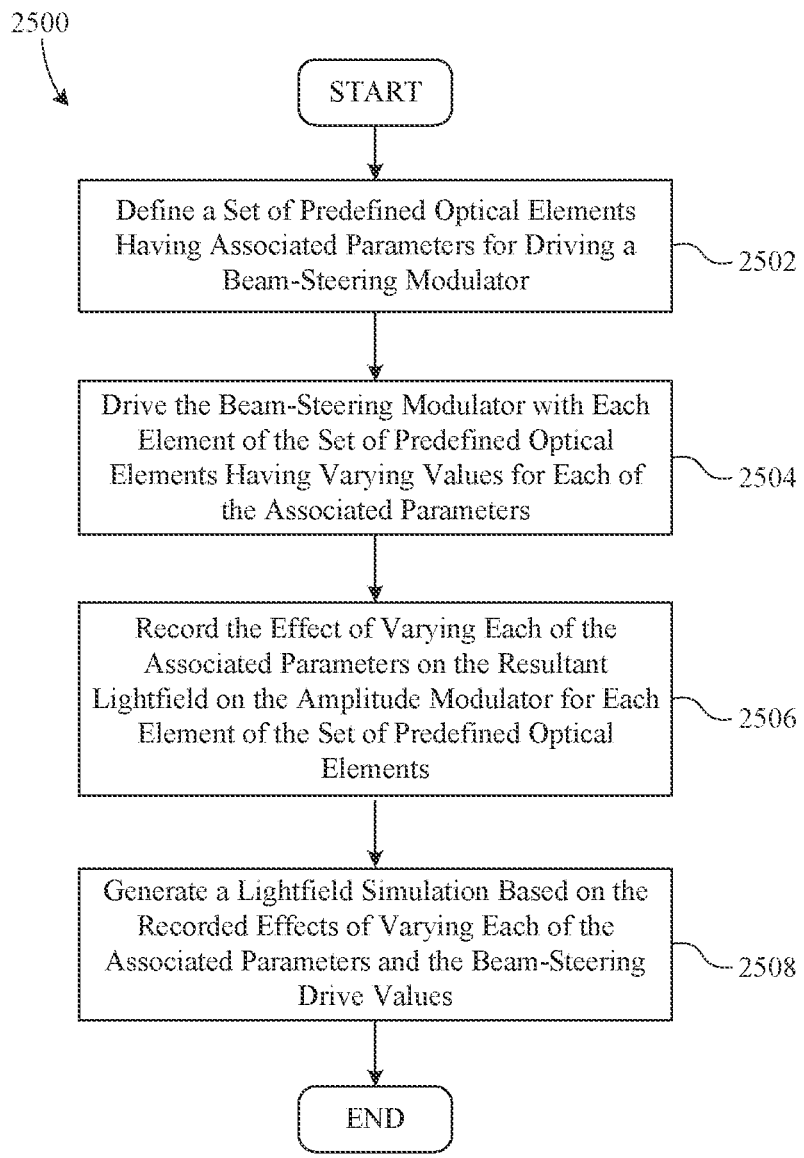
FIG. 25 is a flow chart summarizing yet another example method for generating a lightfield simulation based on a set of beam-steering drive values.

FIG. 25 is a flow chart summarizing yet another method 2500 for generating a lightfield simulation based on a set of beam-steering drive values. In the example embodiment, method 2500 is performed by lightfield simulation module 226, utilizing data from other elements of controller 110. In alternate embodiments some steps of method 2500 can be performed by other elements and/or system designers/users. In a first step 2502, a set of predefined optical elements for driving a beam-steering modulator is defined. Each element of the set of predefined optical elements has associated parameters, which can be varied. In a second step 2504, the beam-steering modulator is driven with each element of the set of predefined optical elements. Each element is driven with varying values for each of the associated parameters. Next, in a third step 2506, the effect on the resultant lightfield on the amplitude modulator of varying each of the associated parameters is recorded for each element of the set of predefined optical elements. Finally, in a fourth step 1508, a lightfield simulation is generated, based, at least in part, on the recorded effects of varying each of the associated parameters and on the beam-steering drive values. Method 2500 will be discussed in more detail with reference to FIG. 26 below.

One example method for simulating a lightfield incident on an amplitude modulator includes combining light spread functions that result from driving a beam-steering modulator with a phase-representation of a pre-determined optical element. FIG. 26 is a sectional view of a portion of projection system 100 during a calibration procedure. Beam-steering modulator 104 is driven with a calibrating phase drive 2602, which includes a plurality of phase representations 2604 of optical elements having various parameters. Each of phase representations 2604 generates a corresponding lightfield 2606, which is incident on amplitude modulator 106.

The characteristics of lightfields 2606 depend on the parameters of the corresponding phase representations 2604. For example, three of phase representations 2604 correspond to convex lenses and act to focus light. The focal lengths and, therefore, the size, sharpness, etc. of corresponding lightfields 2606 depend on the depth of the lens or, more accurately, the characteristics of phase representations 2604. Additionally, the brightnesses of corresponding lightfields 2606 depend on the size of phase representations 2604 or, more accurately, the area of beam-steering modulator 104 that they take up. Three others of phase representations 2604 correspond to concave lenses and act to defocus light. Like those of phase representations 2604 corresponding to convex lenses, those of phase representations 2604 corresponding to concave lenses generate corresponding lightfields 2606 that depend on the characteristics of corresponding phase representations 2604.

During the calibration procedure, the effect of changing the parameters of phase representations 2604 on corresponding lightfields 2606 is compiled by lightfield simulation module 226 (not shown). Lightfields 2606 can be sampled for this purpose by an existing optical sensor in the system or by a removable optical sensor, for example, that is used solely for calibration purposes. Because only a finite combination of parameters can be tested, lightfield simulation module 226 must interpolate between available data points to generate a complete profile for each optical element. Utilizing the complete profile, lightfield simulation module 226 superimposes lightfields 2606 corresponding to each phase representation 2604 used to generate beam-steering drive values for a particular image. Lightfield simulation module 226 can linearly or non-linearly superimpose the contributions from each of lightfields 2606 to generate the final lightfield simulation.

The description of particular embodiments of the present invention is now complete. Many of the described features may be substituted, altered or omitted without departing from the scope of the invention. For example, alternate modulators (e.g., MEMS devices, DMDs, liquid crystal amplitude modulators, etc.), may be substituted for beam-steering modulator 104 and/or amplitude modulator 106. As another example, alternate light propagation/diffraction models, including those utilizing an arbitrary or variable number of terms can be used to calculate the lightfields in generating beam-steering drive values and/or lightfield simulations. These and other deviations from the particular embodiments shown will be apparent to those skilled in the art, particularly in view of the foregoing disclosure.

Various aspects of the present invention may be appreciated from the following enumerated example embodiments (EEEs):

21. A method comprising:
    receiving image data indicative of at least one image to be displayed;
    generating beam-steering drive values for driving a beam-steering spatial light modulator (SLM) based at least in part on said image data;
    generating a simulation of a lightfield produced by said beam-steering SLM and incident on a second SLM based at least in part on said beam-steering drive values; and
    generating amplitude drive values (or modulation drive values) for driving said second SLM based at least in part on said simulation of said lightfield,
    and optionally comprising:
    driving said beam-steering SLM with said beam-steering drive values; and
    driving said second SLM with said amplitude drive values.

22. The method of EEE 21, wherein:
    said step of generating beam-steering drive values includes utilizing a first algorithm to generate said beam-steering drive values;
    said step of generating a simulation of a lightfield produced by said beam-steering SLM includes utilizing a second algorithm to generate said simulation of said lightfield; and
    said step of generating amplitude drive values includes utilizing a third algorithm to generate said amplitude drive values.

23. The method of EEE 22, wherein said step of utilizing a first algorithm to generate said beam-steering drive values includes:
    defining variables relating said beam-steering drive values, locations on said beam-steering SLM, and locations on said second SLM;
    defining a differential equation including said variables, one or more solutions to said differential equation relating particular locations on said beam-steering SLM, particular locations on said second SLM, and said beam-steering drive values;
    generating solutions to said differential equation based on one or more predefined boundary conditions; and
    using said solutions to generate particular beam-steering drive values operative to steer light from a particular location on said beam-steering SLM to a desired location on said second SLM.

24. The method of EEE 23, wherein said step of generating solutions to said differential equation includes utilizing numerical methods in order to generate solutions to said differential equation.

25. The method of EEE 23 or EEE 24, wherein said step of generating solutions to said differential equation includes generating solutions to a second-order partial differential equation.

26. The method of EEE 25, wherein said step of generating solutions to a second-order partial differential equation includes generating solutions to a Monge-Ampère type differential equation.

27. The method of any of EEEs 23-26, wherein said step of generating solutions to said differential equation based on one or more predefined boundary conditions includes defining said boundary conditions such that all said locations on said second SLM are within a perimeter of said second SLM.

28. The method of any of EEEs 23-27, wherein said step of generating solutions to said differential equation based on one or more predefined boundary conditions includes defining said boundary conditions such that all said locations on said second SLM are within a basic geometric shape containing at least part of said lightfield.

29. The method of any of EEEs 23-28, wherein said step of generating solutions to said differential equation based on one or more predefined boundary conditions includes defining said boundary conditions such that all said locations on said second SLM are within an outline of at least one object defined by said image data and embodied within said lightfield.

30. The method of any of EEEs 23-29, wherein said step of generating solutions to said differential equation based on one or more predefined boundary conditions includes defining said boundary conditions such that all said locations on said second SLM are within a piecewise linear approximation of an outline of at least one object defined by said image data and embodied within said lightfield.

31. The method of any of EEEs 23-30, wherein said step of generating solutions to said differential equation based on one or more predefined boundary conditions includes defining said boundary conditions such that all said locations on said beam-steering SLM are mapped to said locations on said second SLM and locations on at least one additional object.

32. The method of EEE 22, wherein said step of utilizing a first algorithm to generate said beam-steering drive values includes:
defining a plurality of virtual beam-steering elements;
associating sections of said beam-steering SLM with respective ones of said virtual beam-steering elements;
determining an allocation of light available from said beam-steering SLM to regions of said second SLM, based at least in part on said image data, to generate a desired lightfield on said second SLM;
associating each said virtual beam-steering element with one of said regions of said second SLM based at least in part on said determined allocation of light and relative positions of said regions of said second SLM and said virtual beam-steering elements; and
generating said beam-steering drive values operative to cause each said section of said beam-steering SLM to steer light to said associated region of said second SLM.

33. The method of EEE 32, wherein said step of utilizing a first algorithm to generate said beam-steering drive values includes determining a second allocation of said light available from said beam-steering SLM to regions of said second SLM at a higher resolution than said allocation of light.

34. The method of EEE 32 or EEE 33, wherein said step of utilizing a first algorithm to generate said beam-steering drive values includes smoothing said beam-steering drive values to generate high-resolution drive values for driving said beam-steering SLM.

35. The method of any of EEEs 32-34, wherein said step of driving said beam-steering SLM with said beam-steering drive values includes driving a tip-tilt mirror device.

36. The method of any of EEEs 32-35, wherein said step of associating each said virtual beam-steering element with one of said regions of said second SLM includes generating a minimum transport solution to associate said virtual beam-steering elements with said regions of said second SLM in order to maintain a maximum diffraction efficiency of said beam-steering SLM.

37. The method of EEE 36, wherein said step of generating a minimum transport solution includes utilizing a Vogel approximation.

38. The method of EEE 22, wherein said step of utilizing a first algorithm to generate said beam-steering drive values includes:
defining a plurality of different virtual optical elements;
generating a phase representation of each of said virtual optical elements;
determining a combination of said virtual optical elements to achieve a desired lightfield, based at least in part on said image data;
combining said phase representations of said virtual optical elements of said combination to determine a phase modulation distribution; and
generating said beam-steering drive values based at least in part on said phase modulation distribution.

39. The method of EEE 38, wherein said step of generating a phase representation of each of said virtual optical elements includes generating said phase representations having adjustable parameters.

40. The method of EEE 39, wherein said parameters include sizes of said various optical elements.

41. The method of EEE 39 or EEE 40, wherein said parameters include focal distances of said various optical elements.

42. The method of any of EEEs 38-41, wherein said step of combining said phase representations of said virtual optical elements includes performing a linear blending function.

43. The method of any of EEEs 38-41, wherein said step of combining said phase representations of said virtual optical elements includes performing a non-linear blending function.

44. The method of EEE 22, wherein said step of utilizing a first algorithm to generate said beam-steering drive values includes:
generating an initial representation of said lightfield produced by said beam-steering SLM and incident on said second SLM based at least in part on said image data;
utilizing a diffraction model to back-propagate said initial representation of said lightfield to form a backward-propagated representation of said lightfield at said beam-steering SLM; and
generating said beam-steering drive values based at least in part on said backward-propagated representation of said lightfield.

45. The method of EEE 44, wherein said step of generating an initial representation of said lightfield includes:
generating said initial representation having zero-phase; and
assigning said representation an amplitude distribution based at least in part on said image data.

46. The method of EEE 44 or EEE 45, wherein said step of utilizing a diffraction model to back-propagate said initial representation of said lightfield includes:
performing a Fourier transform on said initial representation to form an angular spectrum of said initial representation;
multiplying a propagation operator, based at least in part on said diffraction model, in said angular spectrum of said initial representation to generate a backward-propagated angular spectrum; and
performing an inverse Fourier transform on said backward-propagated angular spectrum to generate said backward-propagated representation of said lightfield.

47. The method of EEE 46, wherein said step of utilizing a first algorithm to generate said beam-steering drive values further includes:
extracting a phase representation of said lightfield from said backward-propagated representation of said lightfield; and
filtering said phase representation of said lightfield to form a filtered representation of said lightfield.

48. The method of EEE 47, wherein said step of filtering said phase representation of said lightfield includes filtering said phase representation of said lightfield using a low-pass filter.

49. The method of any of EEEs 46-48, wherein said step of utilizing a first algorithm to generate said beam-steering drive values further includes:
utilizing said diffraction model to forward-propagate said backward-propagated representation of said lightfield to form a forward-propagated representation of said lightfield at said second SLM;
assigning said amplitude distribution to said forward-propagated representation of said lightfield;
utilizing said diffraction model to back-propagate said forward-propagated representation of said lightfield to form an iterated representation of said lightfield at said beam-steering SLM;
setting said backward-propagated representation of said lightfield equal to said iterated representation of said lightfield; and
repeating said steps of utilizing said diffraction model to forward-propagate said backward-propagated representation of said lightfield, assigning said amplitude distribution to said forward-propagated representation, utilizing said diffraction model to back-propagate said forward-propagated representation of said lightfield, and setting said backward-propagated representation of said lightfield equal to said iterated representation of said lightfield until said backward-propagated representation of said lightfield meets a predetermined termination condition.

50. The method of EEE 49, wherein said predetermined termination condition is met when a difference between a first calculated brightness of said iterated representation of said lightfield and a second calculated brightness of said backward-propagated representation of said lightfield is within a predetermined range.

51. The method of EEE 22, wherein said step of utilizing a first algorithm to generate said beam-steering drive values includes:
dividing said at least one image into a plurality of regions;
determining which regions of said plurality of regions contain at least one location having a brightness greater than a predetermined brightness, based at least in part on said image data;
generating a plurality of sets of regional drive values, each set of said regional drive values corresponding to a full plane of drive values for said beam-steering SLM and having values operative to generate a region of said lightfield corresponding to one of said regions of said image containing at least one location having said brightness greater than said predetermined brightness if used individually to drive said beam-steering SLM;
determining an amount of light required for each region of said lightfield; and
combining said sets of regional drive values based at least in part on said determined amounts of light to generate said beam-steering drive values.

52. The method of EEE 51, wherein said step of combining said sets of regional drive values includes combining said sets of regional drive values such that a portion of said beam-steering drive values corresponding to one of said sets of regional drive values is proportional to a total brightness of said corresponding one of said regions of said image containing at least one location having said brightness greater than said predetermined brightness.

53. The method of EEE 51 or EEE 52, wherein said predetermined brightness is zero.

54. The method of any of EEEs 51-53, wherein a number of said plurality of regions is equal to a number of pixels in said image data.

55. The method of any of EEEs 22-54, wherein said step of utilizing a second algorithm to generate said simulation of said lightfield includes:
defining a point of origin on said beam-steering SLM for at least one light ray contributing to said lightfield;
determining a path traveled by said at least one light ray based at least in part on a steering angle of said light ray with respect to a surface of said beam-steering SLM, said steering angle of said light ray being determined based on said beam-steering drive values associated with a portion of said beam-steering SLM at said point of origin; and
generating said simulation of said lightfield based at least in part on said path.

56. The method of EEE 55, wherein said step of determining a path traveled by said at least one light ray includes determining a displacement of said light ray in a plane of said lightfield at a surface of said second SLM.

57. The method of EEE 55 or EEE 56, wherein said step of determining a path traveled by said at least one light ray includes determining a transformation of a line element comprised of points of origin of at least two light rays.

58. The method of EEE 57, wherein said step of determining a transformation of a line element includes:
determining a displacement of said line element;
determining a rotation of said line element; and
determining a change in length of said line element.

59. The method of any of EEEs 55-58, wherein said step of determining a path traveled by said at least one light ray includes determining a transformation of an area element comprised of said points of origin of at least three light rays.

60. The method of EEE 59, wherein said step of determining a transformation of an area element comprised of said points of origin of at least three light rays includes:
determining a displacement of said area element;
determining a rotation of said area element; and
determining a change in area of said area element.

61. The method of any of EEEs 55-60, wherein said step of determining a path traveled by said at least one light ray includes:
generating a mapping function that maps an origin point of said at least one light ray on said beam-steering SLM to a destination point of said at least one light ray on said second SLM, said mapping function defining a first coordinate of said destination point as a first function of two coordinates of said origin point and defining a second coordinate of said destination point as a second function of said two coordinates of said origin point;

defining a Jacobian matrix including first-order partial derivatives of said first function with respect to each of said two coordinates of said origin point, said Jacobian matrix additionally including first-order partial derivatives of said second function with respect to each of said two coordinates of said origin point;

calculating a determinant of said Jacobian matrix; and sampling said determinant of said Jacobian matrix at a plurality of points on said second SLM.

62. The method of any of EEEs 22-54, wherein said step of utilizing a second algorithm to generate said simulation of said lightfield includes:

defining each of a plurality of points on said beam-steering SLM as a source of a spherical wave propagating toward said second SLM, each said spherical wave having a phase defined by an associated one of said beam-steering drive values;

utilizing a wave optics model to generate an interference pattern resulting from said spherical waves; and generating said simulation of said lightfield based at least in part on said interference pattern.

63. The method of EEE 62, wherein said step of utilizing a wave optics model to generate an interference pattern includes utilizing a Rayleigh-Sommerfeld model to generate said interference pattern.

64. The method of EEE 62, wherein said step of utilizing a wave optics model to generate an interference pattern includes utilizing a Fresnel-Kirchoff model to generate said interference pattern.

65. The method of any of EEEs 22-54, wherein said step of utilizing a second algorithm to generate said simulation of said lightfield includes:

directing at least a portion of light from said beam-steering SLM toward an optical sensor;

capturing information corresponding to said portion of light using said optical sensor; and generating said simulation of said lightfield based at least in part on said information corresponding to said portion of light.

66. The method of EEE 65, wherein:

said step of generating a simulation of a lightfield produced by said beam-steering SLM and incident on a second SLM includes generating a simulation of said lightfield incident on a digital micromirror device (DMD); and said step of capturing information corresponding to said portion of light using said optical sensor includes capturing off-state light from said DMD.

67. The method of EEE 66 or EEE 65, wherein said step of capturing off-state light from said DMD includes:

driving every pixel of said DMD to direct off-state light toward said optical sensor for a period of time; and capturing said lightfield using said optical sensor.

68. The method of any of EEEs 65-67, wherein said step of directing at least a portion of light from said beam-steering SLM toward an optical sensor includes splitting said lightfield into said portion directed toward said optical sensor and a second portion incident on said second SLM.

69. The method of any of EEEs 65-68, wherein said step of capturing information corresponding to said portion of light using said optical sensor includes capturing light comprising at least one diffraction order from said second SLM.

70. The method of any of EEEs 65-69, wherein said step of capturing information corresponding to said portion of light using said optical sensor includes capturing light from an existing reflection within said projection system.

71. The method of any of EEEs 65-69, wherein said step of generating said simulation of said lightfield based at least in part on said information corresponding to said portion of light includes:

generating a predetermined simulation of said lightfield; and augmenting said predetermined simulation of said lightfield with said information corresponding to said portion of light.

72. The method of EEE 71, wherein said step of generating a predetermined simulation of said lightfield includes generating said predetermined simulation of said lightfield based at least in part on said beam-steering drive values.

73. The method of EEE 71 or EEE 72, wherein:

said step of receiving image data indicative of at least one image to be displayed includes receiving video data; and said step of generating a predetermined simulation of said lightfield includes utilizing a prior simulation of a lightfield corresponding to a prior image of said video data as said predetermined simulation.

74. The method of any of EEEs 22-54, wherein said step of utilizing a second algorithm to generate said simulation of said lightfield includes:

providing a plurality of predetermined lightfield simulations, each corresponding to a predetermined set of phase drive values;

identifying particular ones of said sets of said phase drive values based on said beam-steering drive values;

retrieving said predetermined lightfield simulations corresponding to said identified ones of said sets of phase drive values; and generating said simulation of said lightfield by combining said retrieved predetermined lightfield simulations.

75. The method of EEE 74, wherein said step of providing a plurality of predetermined lightfield simulations includes:

providing a finite number of predetermined lightfield simulations each corresponding to a predetermined set of phase drive values having a particular set of parameters; and interpolating between said finite number of predetermined lightfield simulations to generate a greater number of predetermined lightfield simulations corresponding to a greater number of sets of phase drive values having different sets of parameters.

76. The method of EEE 74 or EEE 75, wherein said step of combining said retrieved predetermined lightfield simulations includes linearly superimposing said retrieved predetermined lightfield simulations.

77. The method of EEE 74 or EEE 75, wherein said step of combining said retrieved predetermined lightfield simulations includes non-linearly superimposing said retrieved predetermined lightfield simulations.

133. A controller for a projection system, comprising:

a processing unit configured to execute code;

an interface coupled to receive image data indicative of at least one image to be displayed; and memory electrically coupled to store data and said code, said data and said code including:

a beam-steering drive module configured to generate beam-steering drive values for driving a beam-steering spatial light modulator (SLM) based at least in part on said image data; and/or a lightfield simulation module configured to generate a simulation of a lightfield produced by said beam-steering SLM and incident on a second SLM based at least in part on said beam-steering drive values; and/or an amplitude drive module configured to generate amplitude drive values for driving said second SLM based at least in part on said simulation of said lightfield.

134. The controller of EEE 133, wherein said beam-steering drive module:

defines variables relating said beam-steering drive values, locations on said beam-steering SLM, and locations on said second SLM;

defines a differential equation including said variables, one or more solutions to said differential equation relating particular locations on said beam-steering SLM, particular locations on said second SLM, and said beam-steering drive values;

generates solutions to said differential equation based on one or more predefined boundary conditions; and uses said solutions to generate particular beam-steering drive values operative to steer light from a particular location on said beam-steering SLM to a desired location on said second SLM.

143. The controller of EEE 133, wherein said beam-steering drive module:

defines a plurality of virtual beam-steering elements;

associates sections of said beam-steering SLM with respective ones of said virtual beam-steering elements;

determines an allocation of light available from said beam-steering SLM to regions of said second SLM, based at least in part on said image data, to generate a desired lightfield on said second SLM;

associates each said virtual beam-steering element with one of said regions of said second SLM based at least in part on said determined allocation of light and relative positions of said regions of said second SLM and said virtual beam-steering elements; and generates said beam-steering drive values operative to cause each said section of said beam-steering SLM to steer light to said associated region of said second SLM.

149. The controller of EEE 133, wherein said beam-steering drive module:

defines a plurality of different virtual optical elements;

generates a phase representation of each of said virtual optical elements;

determines a combination of said virtual optical elements to achieve a desired lightfield, based at least in part on said image data;

combines said phase representations of said virtual optical elements of said combination to determine a phase modulation distribution; and generates said beam-steering drive values based at least in part on said phase modulation distribution.

155. The controller of EEE 133, wherein said beam-steering drive module:

generates an initial representation of said lightfield produced by said beam-steering SLM and incident on said second SLM based at least in part on said image data;

utilizes a diffraction model to back-propagate said initial representation of said lightfield to form a backward-propagated representation of said lightfield at said beam-steering SLM; and generates said beam-steering drive values based at least in part on said backward-propagated representation of said lightfield.

162. The controller of EEE 133, wherein said beam-steering drive module:

divides said at least one image into a plurality of regions;

determines which regions of said plurality of regions contain at least one location having a brightness greater than a predetermined brightness, based at least in part on said image data;

generates a plurality of sets of regional drive values, each set of said regional drive values corresponding to a full plane of drive values for said beam-steering SLM and having values operative to generate a region of said lightfield corresponding to one of said regions of said image containing at least one location having said brightness greater than said predetermined brightness if used individually to drive said beam-steering SLM;

determines an amount of light required for each region of said lightfield; and combines said sets of regional drive values based at least in part on said determined amounts of light to generate said beam-steering drive values.

166. The controller of any of EEEs 133, 134, 143, 149, 155 and 162, wherein said lightfield simulation module:

defines a point of origin on said beam-steering SLM for at least one light ray contributing to said lightfield;

determines a path traveled by said at least one light ray based at least in part on a steering angle of said light ray with respect to a surface of said beam-steering SLM, said steering angle of said light ray being determined based on said beam-steering drive values associated with a portion of said beam-steering SLM at said point of origin; and generates said simulation of said lightfield based at least in part on said path.

173. The controller of any of EEEs 133, 134, 143, 149, 155 and 162, wherein said lightfield simulation module:

defines each of a plurality of points on said beam-steering SLM as a source of a spherical wave propagating toward said second SLM, each said spherical wave having a phase defined by an associated one of said beam-steering drive values;

utilizes a wave optics model to generate an interference pattern resulting from said spherical waves; and generates said simulation of said lightfield based at least in part on said interference pattern.

176. The controller of any of EEEs 133, 134, 143, 149, 155 and 162, wherein said lightfield simulation module:

directs at least a portion of light from said beam-steering SLM toward an optical sensor;

captures information corresponding to said portion of light using said optical sensor; and generates said simulation of said lightfield based at least in part on said information corresponding to said portion of light.

183. The controller of any of EEEs 133, 134, 143, 149, 155 and 162, wherein said lightfield simulation module:

accesses a plurality of predetermined lightfield simulations, each corresponding to a predetermined set of phase drive values;

identifies particular ones of said sets of said phase drive values based on said beam-steering drive values;

retrieves said predetermined lightfield simulations corresponding to said identified ones of said sets of phase drive values; and generates said simulation of said lightfield by combining said retrieved predetermined lightfield simulations.

The invention claimed is:

1. A method for displaying images by a projection system, the projection system comprising a beam-steering spatial light modulator, the beam-steering spatial light modulator being configured to selectively steer light to form an image on a predetermined location, the method comprising:

receiving image data indicative of at least one image to be displayed; and generating beam-steering drive values for driving a beam-steering spatial light modulator based at least in part on the image data, wherein generating the beam-steering drive values includes:

generating a mathematical description of a wavefield corresponding to a desired image at the predetermined location, backward-propagating the wavefield to generate a mathematical description of the wavefield at the beam-steering spatial light modulator, filtering, with a filter, the mathematical description of the wavefield at the beam-steering spatial light modulator, wherein the filter is configured to block DC-frequency light, and forward-propagating the filtered mathematical description of the wavefield to generate a mathematical description of a new wavefield at the predetermined location, and driving the beam-steering spatial light modulator with the beam-steering drive values.

2. The method of claim 1, wherein
the projection system comprises an amplitude modulator at the predetermined location, and
the mathematical description of the wavefield at the amplitude modulator includes an amplitude distribution equal to an intensity distribution of the desired image at the predetermined location.

3. The method of claim 1, wherein the mathematical description of the wavefield at the predetermined location is zero-phase.

4. The method of claim 1, wherein the filter is a low-pass filter.

5. The method of claim 1, wherein
the projection system comprises an amplitude modulator at the predetermined location, and
forward-propagating the filtered mathematical description of the wavefield includes quantizing a phase of the filtered mathematical description of the wavefield to a bit-depth of the amplitude modulator.

6. The method of claim 1, wherein forward-propagating the filtered mathematical description of the wavefield includes filtering an angular spectrum of the filtered mathematical description of the wavefield such that the angular spectrum includes only angular frequencies smaller than a specified threshold.

7. The method of claim 1, wherein the mathematical description of the new wavefield at the predetermined location models both noise introduced by quantization and a phase-only nature of the beam-steering spatial light modulator.

8. The method of claim 1, wherein the filter is selected from the group consisting of a Gaussian filter and a sinc filter.

9. The method of claim 1, wherein the method comprises, in a case where a predetermined termination condition is not met, iterating the operations of backward-propagating, filtering, and forward-propagating, each time using the new wavefield generated in the operation of forward-propagating of the previous iteration in the operation of backward-propagating of the following iteration.

10. The method of claim 9, wherein the predetermined termination condition is a measurement of a total power of the wavefield at the beam-steering spatial light modulator compared to a predefined threshold.

11. A controller for controlling a modulation projection system, the projection system comprising a beam-steering spatial light modulator, the beam-steering spatial light modulator being configured to selectively steer light to form an image on a predetermined location, the controller comprising:

a processor configured to execute code;

an interface coupled to receive image data indicative of at least one image to be displayed; and a memory electrically coupled to store data and the code, the data and the code including:

a beam-steering drive generation module configured to generate beam-steering drive values for driving a beam-steering spatial light modulator based at least in part on the image data, wherein generating the beam-steering drive values includes:

generating a mathematical description of a wavefield corresponding to a desired image at the predetermined location, backward-propagating the wavefield to generate a mathematical description of the wavefield at the beam-steering spatial light modulator, filtering, with a filter, the mathematical description of the wavefield at the beam-steering spatial light modulator, wherein the filter is configured to block DC-frequency light, and forward-propagating the filtered mathematical description of the wavefield to generate a mathematical description of a new wavefield at the predetermined location, and a modulation drive generation module configured to drive the beam-steering spatial light modulator with the beam-steering drive values.

12. The controller of claim 11, wherein
the projection system comprises an amplitude modulator at the predetermined location, and
the mathematical description of the wavefield at the amplitude modulator includes an amplitude distribution equal to an intensity distribution of the desired image at the predetermined location.

13. The controller of claim 11, wherein the mathematical description of the wavefield at the predetermined location is zero-phase.

14. The controller of claim 11, wherein the filter is a low-pass filter.

15. The controller of claim 11, wherein
the projection system comprises an amplitude modulator at the predetermined location, and
forward-propagating the filtered mathematical description of the wavefield-includes quantizing a phase of the filtered mathematical description of the wavefield to a bit-depth of the amplitude modulator.

16. The controller of claim 11, wherein forward-propagating the filtered mathematical description of the wavefield includes filtering an angular spectrum of the filtered mathematical description of the wavefield such that the angular spectrum includes only angular frequencies smaller than a specified threshold.

17. The controller of claim 11, wherein the mathematical description of the new wavefield at the predetermined location models both noise introduced by quantization and a phase-only nature of the beam-steering spatial light modulator.

18. The controller of claim 11, wherein generating the beam-steering drive values includes, in a case where a predetermined termination condition is not met, iterating the operations of backward-propagating, filtering, and forward-propagating, each time using the new wavefield generated in the operation of forward-propagating of the previous iteration in the operation of backward-propagating of the following iteration.

19. The controller of claim 18, wherein filtering the mathematical description of the wavefield at the beam-steering spatial light modulator includes altering the filter after successive iterations of the operations of backward-propagating, filtering, and forward-propagating.

20. The controller of claim 11, wherein the filter is selected from the group consisting of a Gaussian filter and a sinc filter.

* * * * *